United States Patent
Selle

(10) Patent No.: US 9,212,676 B2
(45) Date of Patent: Dec. 15, 2015

(54) FASTENER

(75) Inventor: Stephen Selle, Mentor, OH (US)

(73) Assignee: STAFAST PRODUCTS. INC., Painesville, OH (US)

( * ) Notice: Subject to any disclaimer, the term of this patent is extended or adjusted under 35 U.S.C. 154(b) by 1161 days.

(21) Appl. No.: 12/621,441

(22) Filed: Nov. 18, 2009

(65) Prior Publication Data

US 2011/0117355 A1    May 19, 2011

(51) Int. Cl.
F16B 12/20    (2006.01)
F16B 21/08    (2006.01)
F16B 35/06    (2006.01)

(52) U.S. Cl.
CPC ............ *F16B 12/20* (2013.01); *F16B 21/084* (2013.01); *F16B 35/06* (2013.01); *Y10T 428/249923* (2015.04)

(58) Field of Classification Search
USPC ........... 403/296, 298, 299, DIG. 11–DIG. 13; 411/107, 111, 388, 508–510, 913; 312/111, 140; 24/289, 291, 297, 453, 24/458; 297/463.1, 440.14, 440.1, 440.23
See application file for complete search history.

(56) References Cited

U.S. PATENT DOCUMENTS

| | | | |
|---|---|---|---|
| 180,064 A | 7/1876 | Rebasz | |
| 244,379 A | 7/1881 | Coulter et al. | |
| 397,988 A | 2/1889 | Kimball | |
| 797,545 A | 8/1905 | Reed | |
| 812,294 A | 2/1906 | Ette | |
| 1,754,672 A * | 4/1930 | Dyresen | 24/688 |
| 1,773,146 A | 8/1930 | Kellogg | |
| 1,881,836 A | 10/1932 | Mitchell | |
| 1,893,067 A | 1/1933 | Arenz | |
| 1,919,728 A | 7/1933 | Kellogg | |
| 2,049,104 A | 7/1936 | Charlton | |
| 2,321,497 A | 8/1939 | Luce | |
| 2,208,779 A | 7/1940 | Tinnerman | |
| 2,267,379 A | 12/1941 | Tinnerman | |
| 2,314,756 A | 3/1943 | Bedford, Jr. | |
| 2,343,947 A | 3/1944 | Auslander | |
| 2,381,936 A | 8/1945 | Sargent | |
| 2,383,141 A | 8/1945 | Maage | |
| 2,477,430 A | 7/1949 | Swanstrom | |
| 2,685,721 A | 8/1954 | Eves | |
| 2,926,409 A * | 3/1960 | Perry | 24/681 |
| 2,936,668 A | 5/1960 | Meyer | |
| 2,968,206 A | 1/1961 | Bunnosuke | |
| 3,004,784 A * | 10/1961 | Selby | 403/19 |
| 3,037,596 A * | 6/1962 | Fordyce | 52/511 |
| 3,050,097 A | 8/1962 | Cochran | |
| 3,146,656 A | 9/1964 | Richards | |

(Continued)

*Primary Examiner* — Joshua Kennedy
(74) *Attorney, Agent, or Firm* — Woodling, Krost and Rust

(57) ABSTRACT

A fastener in combination with an ornamental piece of wood and a furniture substrate wherein the fastener includes a first portion with branches. Each of the branches of the first portion of the fastener include an arc-shaped end surface. The fastener includes a threaded portion. The fastener includes a flange portion positioned intermediate the first portion and the threaded portion. The ornamental piece of wood includes an aperture therein. The threaded portion of the fastener is threaded into the aperture in the ornamental piece of wood. The flange of the fastener engages the ornamental piece of wood. The furniture substrate includes a slot therein. The first portion of the fastener interengages the slot in the furniture substrate securing the ornamental piece of wood to the furniture substrate. The first portion of the fastener is slidable with respect to the slot positioning the ornamental piece of wood with respect to the furniture substrate.

23 Claims, 17 Drawing Sheets

(56) References Cited

U.S. PATENT DOCUMENTS

| | | | |
|---|---|---|---|
| 3,234,612 A | 2/1966 | Raymond | |
| 3,235,917 A | 2/1966 | Skubic | |
| 3,270,610 A | 9/1966 | Knowlton | |
| 3,289,724 A | 12/1966 | Ernest | |
| 3,319,509 A | 5/1967 | Constantino | |
| 3,353,580 A | 11/1967 | Benjamin | |
| 3,358,727 A | 12/1967 | Hughes | |
| 3,403,218 A | 9/1968 | Norden | |
| 3,455,198 A * | 7/1969 | Barrett | 411/388 |
| 3,505,636 A | 4/1970 | McDowell | |
| 3,646,982 A | 3/1972 | Cushman | |
| 3,704,507 A | 12/1972 | Grube | |
| 3,809,139 A | 5/1974 | Strain | |
| 3,845,860 A | 11/1974 | Ladouceur et al. | |
| 3,878,599 A | 4/1975 | Ladouceur et al. | |
| 3,920,059 A | 11/1975 | Grube | |
| 3,926,236 A | 12/1975 | Pouch et al. | |
| 3,962,828 A | 6/1976 | McAllister | |
| 3,967,412 A | 7/1976 | Governale | |
| D241,413 S * | 9/1976 | Drake | D8/393 |
| 4,074,464 A | 2/1978 | McCay | |
| 4,172,523 A | 10/1979 | Weglage | |
| 4,279,341 A | 7/1981 | Pleickhardt | |
| 4,306,654 A | 12/1981 | Grube | |
| 4,318,208 A * | 3/1982 | Borja et al. | 24/305 |
| 4,352,258 A | 10/1982 | Bursk | |
| 4,376,334 A | 3/1983 | Miller | |
| 4,377,360 A | 3/1983 | Kennedy | |
| 4,379,537 A | 4/1983 | Perrault et al. | |
| 4,387,535 A | 6/1983 | Corbo | |
| 4,447,987 A | 5/1984 | Lesosky | |
| 4,454,699 A * | 6/1984 | Strobl | 52/585.1 |
| 4,476,653 A | 10/1984 | Speer | |
| 4,508,478 A | 4/1985 | Leistner | |
| 4,580,322 A | 4/1986 | Wright | |
| 4,595,325 A | 6/1986 | Moran | |
| 4,625,260 A | 11/1986 | Jordan et al. | |
| D293,880 S * | 1/1988 | Takahashi | D8/354 |
| 4,728,238 A * | 3/1988 | Chisholm et al. | 411/510 |
| 4,768,907 A | 9/1988 | Gauron | |
| 4,790,701 A | 12/1988 | Baubles | |
| 4,860,513 A | 8/1989 | Whitman | |
| 4,903,831 A | 2/1990 | Francis | |
| 4,913,609 A | 4/1990 | Mauer | |
| 4,945,680 A | 8/1990 | Giguere | |
| 4,961,553 A | 10/1990 | Todd | |
| 4,971,499 A | 11/1990 | Ladouceur | |
| 5,010,690 A | 4/1991 | Geoffrey | |
| 5,078,537 A | 1/1992 | Nomura | |
| 5,096,350 A | 3/1992 | Peterson | |
| 5,114,014 A | 5/1992 | Ascalon et al. | |
| 5,136,814 A | 8/1992 | Headrick | |
| 5,152,582 A * | 10/1992 | Magnuson | 297/440.2 |
| 5,155,960 A * | 10/1992 | Shaanan | 52/584.1 |
| 5,179,804 A | 1/1993 | Young | |
| 5,195,854 A | 3/1993 | Nagayama | |
| 5,199,836 A | 4/1993 | Gogarty | |
| 5,207,546 A * | 5/1993 | Bouverie | 411/553 |
| 5,214,843 A | 6/1993 | Bromley et al. | |
| 5,230,181 A | 7/1993 | Geoffrey | |
| 5,238,344 A | 8/1993 | Nagayama | |
| 5,263,803 A | 11/1993 | Anquetin | |
| 5,273,351 A | 12/1993 | Rubel | |
| 5,299,686 A | 4/1994 | Bromley et al. | |
| 5,314,427 A | 5/1994 | Goble et al. | |
| 5,327,645 A | 7/1994 | Bromley et al. | |
| 5,348,432 A | 9/1994 | Nagayama | |
| 5,388,940 A | 2/1995 | Herren | |
| 5,391,031 A | 2/1995 | Medal | |
| 5,426,894 A | 6/1995 | Headrick | |
| 5,429,466 A | 7/1995 | Nagayama | |
| 5,489,173 A | 2/1996 | Hofle | |
| 5,501,558 A | 3/1996 | Figge | |
| 5,503,596 A | 4/1996 | Nagayama | |
| 5,517,788 A | 5/1996 | McGough | |
| 5,524,391 A | 6/1996 | Joffe | |
| 5,588,266 A | 12/1996 | Headrick | |
| 5,611,173 A | 3/1997 | Headrick | |
| 5,618,144 A | 4/1997 | Leistner | |
| 5,624,217 A | 4/1997 | Hungerford | |
| 5,638,641 A | 6/1997 | Joffe | |
| 5,722,131 A | 3/1998 | Leistner | |
| 5,762,190 A | 6/1998 | Leistner | |
| 5,823,702 A | 10/1998 | Bynum | |
| 5,863,164 A | 1/1999 | Leistner | |
| 5,893,538 A | 4/1999 | Onishi et al. | |
| 5,904,461 A | 5/1999 | McKarge | |
| 5,918,738 A | 7/1999 | Leistner | |
| 5,993,320 A | 11/1999 | Selle | |
| 6,071,052 A | 6/2000 | Kerr | |
| 6,095,738 A | 8/2000 | Selle | |
| 6,129,493 A | 10/2000 | Leistner | |
| 6,174,117 B1 | 1/2001 | Kawatani et al. | |
| 6,183,181 B1 | 2/2001 | Leistner | |
| 6,185,870 B1 | 2/2001 | Mettler | |
| 6,203,231 B1 | 3/2001 | Salice | |
| 6,209,722 B1 | 4/2001 | Leistner | |
| 6,272,814 B1 | 8/2001 | Ikuta et al. | |
| 6,305,888 B1 | 10/2001 | Leistner | |
| 6,345,477 B1 | 2/2002 | Kepler et al. | |
| 6,349,907 B1 | 2/2002 | Hollington et al. | |
| 6,407,351 B1 | 6/2002 | Meyer | |
| 6,450,746 B1 | 9/2002 | Kirimoto | |
| 6,520,704 B1 * | 2/2003 | Vidmar et al. | 403/188 |
| 6,637,994 B2 | 10/2003 | Leistner | |
| 6,640,968 B2 | 11/2003 | Selle | |
| 6,659,677 B1 * | 12/2003 | Exposito | 403/24 |
| 6,701,570 B2 | 3/2004 | Henriott et al. | |
| 6,832,696 B2 | 12/2004 | Donner | |
| 6,866,769 B2 | 3/2005 | Anderson et al. | |
| 6,918,727 B2 * | 7/2005 | Huang | 411/389 |
| 7,128,511 B2 | 10/2006 | Hewgill | |
| 7,287,732 B2 | 10/2007 | Balistreri | |
| 7,427,180 B2 | 9/2008 | Ladoucer et al. | |
| 7,484,700 B2 | 2/2009 | Selle | |
| 7,506,464 B2 * | 3/2009 | Tarter et al. | 40/596 |
| 7,524,129 B2 | 4/2009 | Selle | |
| 7,762,533 B2 * | 7/2010 | DeRogatis et al. | 256/67 |
| 2003/0049097 A1 | 3/2003 | Selle | |
| 2003/0059272 A1 * | 3/2003 | Petrok et al. | 411/107 |
| 2004/0089858 A1 * | 5/2004 | DeRogatis et al. | 256/59 |
| 2004/0234356 A1 | 11/2004 | Parker et al. | |
| 2005/0232724 A1 | 10/2005 | Selle | |
| 2006/0059806 A1 | 3/2006 | Gosling et al. | |
| 2006/0175592 A1 * | 8/2006 | DeRogatis et al. | 256/59 |
| 2008/0069660 A1 | 3/2008 | Selle | |
| 2008/0193254 A1 | 8/2008 | Selle et al. | |
| 2010/0196091 A1 * | 8/2010 | Selle | 403/409.1 |

* cited by examiner

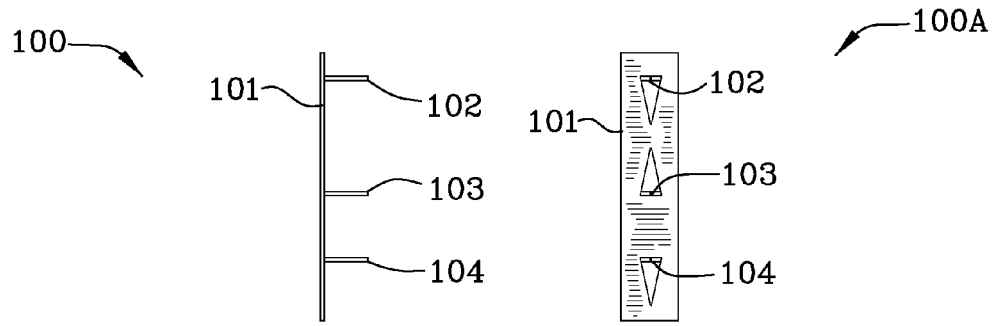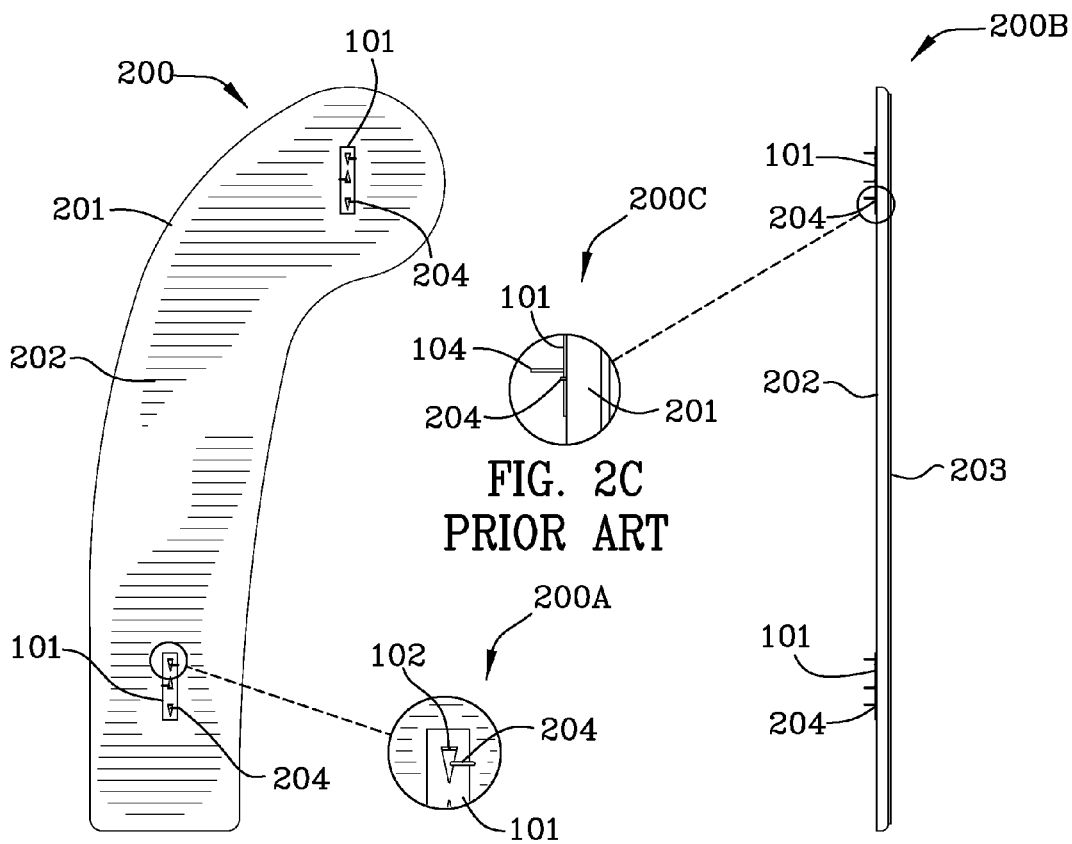

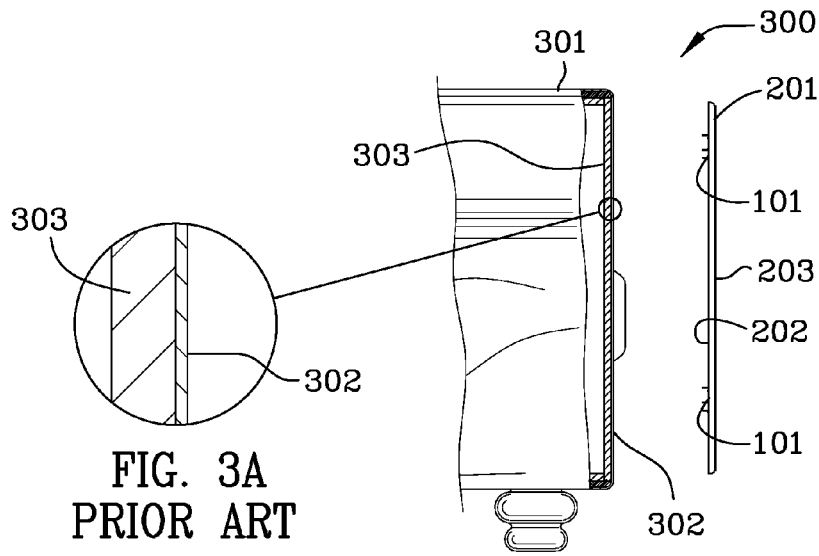
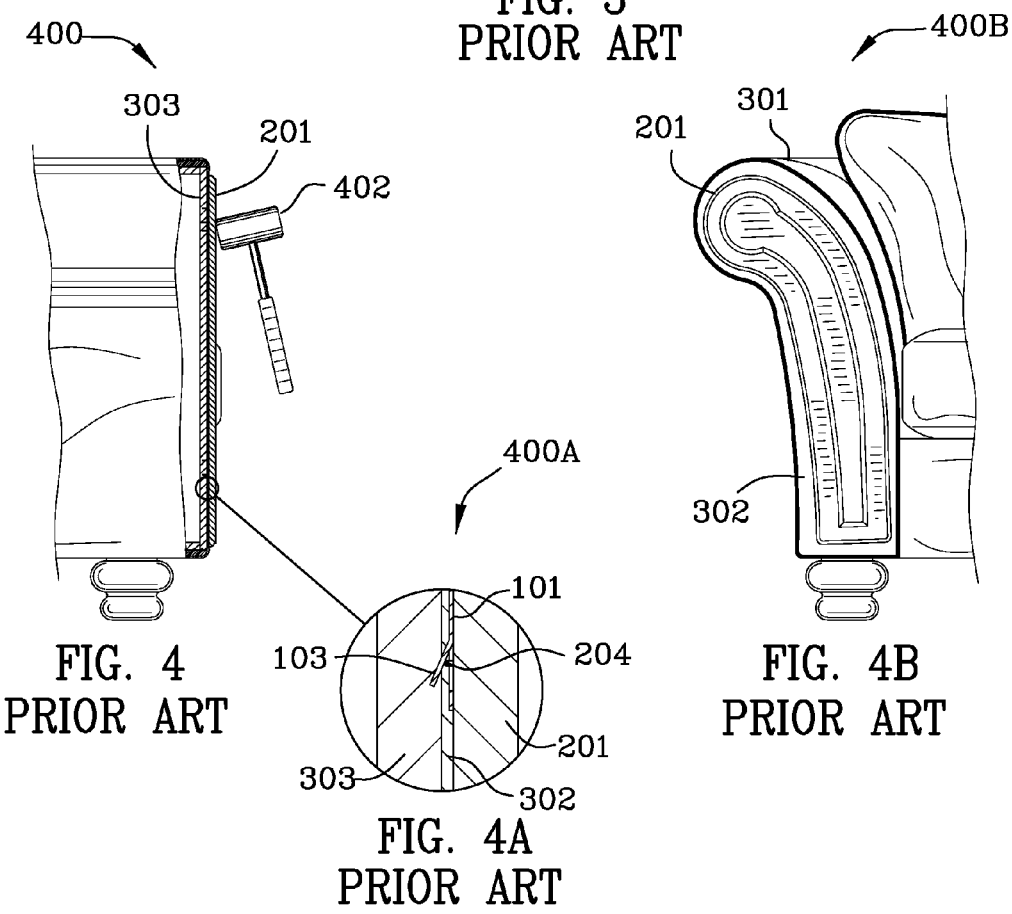
FIG. 3A PRIOR ART
FIG. 3 PRIOR ART
FIG. 4 PRIOR ART
FIG. 4A PRIOR ART
FIG. 4B PRIOR ART

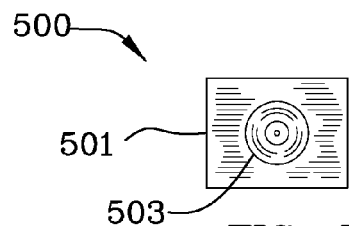
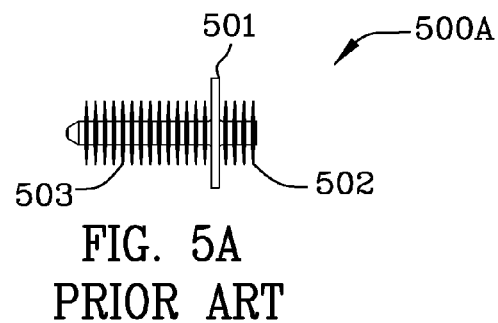
FIG. 5 PRIOR ART
FIG. 5A PRIOR ART
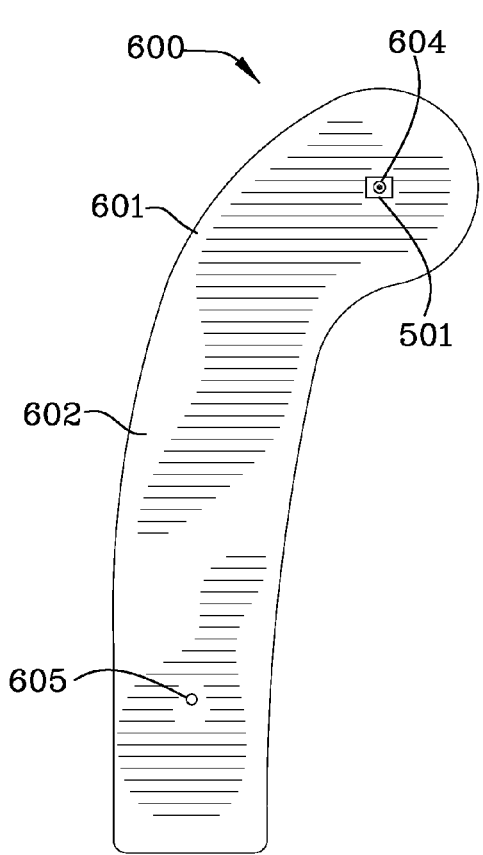
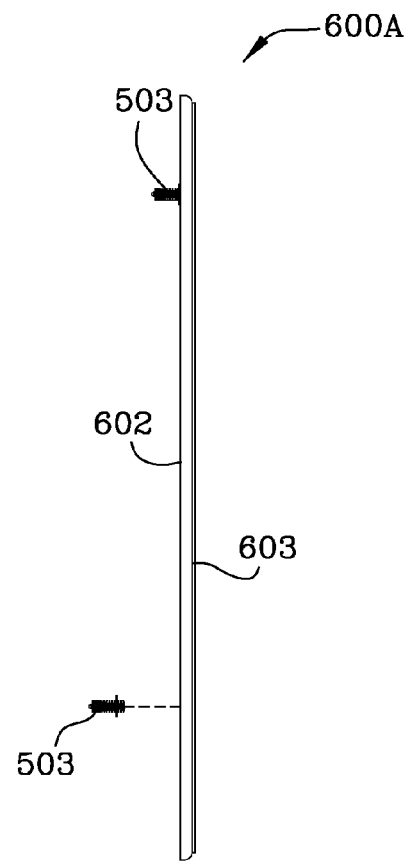
FIG. 6 PRIOR ART
FIG. 6A PRIOR ART

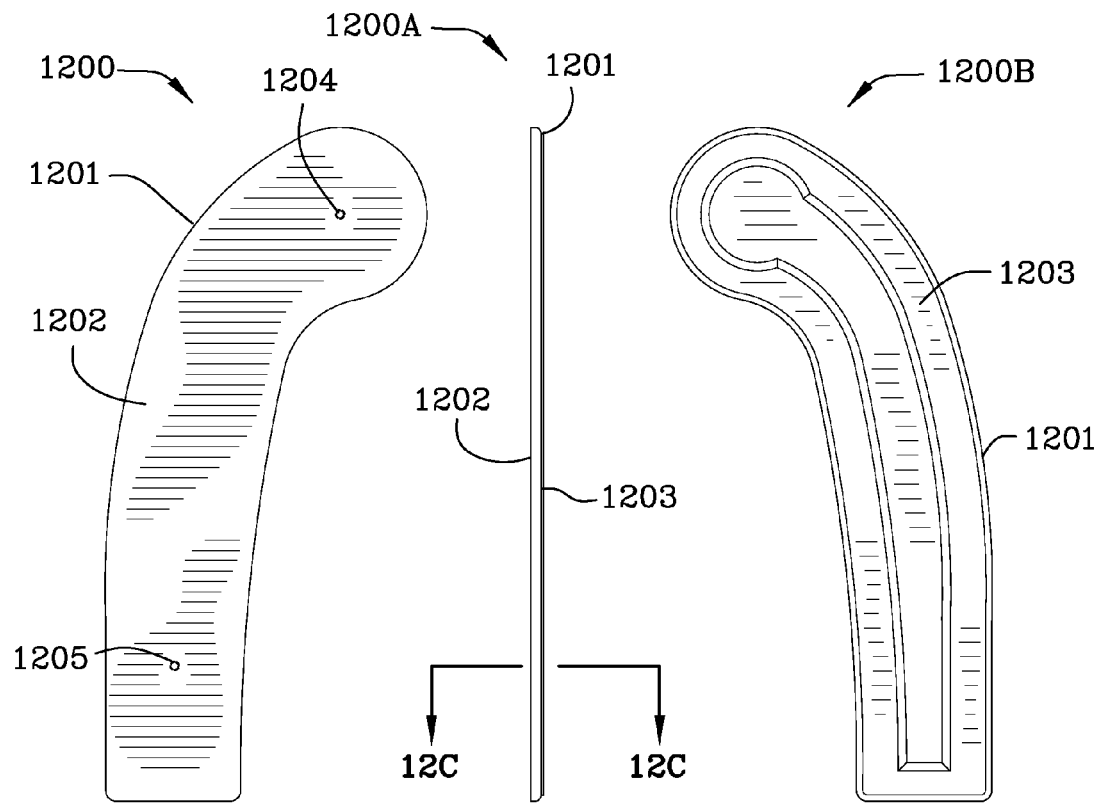
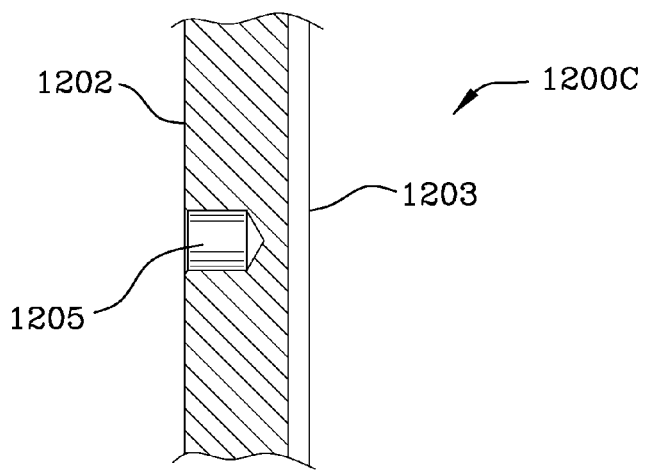
FIG. 12   FIG. 12A   FIG. 12B
FIG. 12C

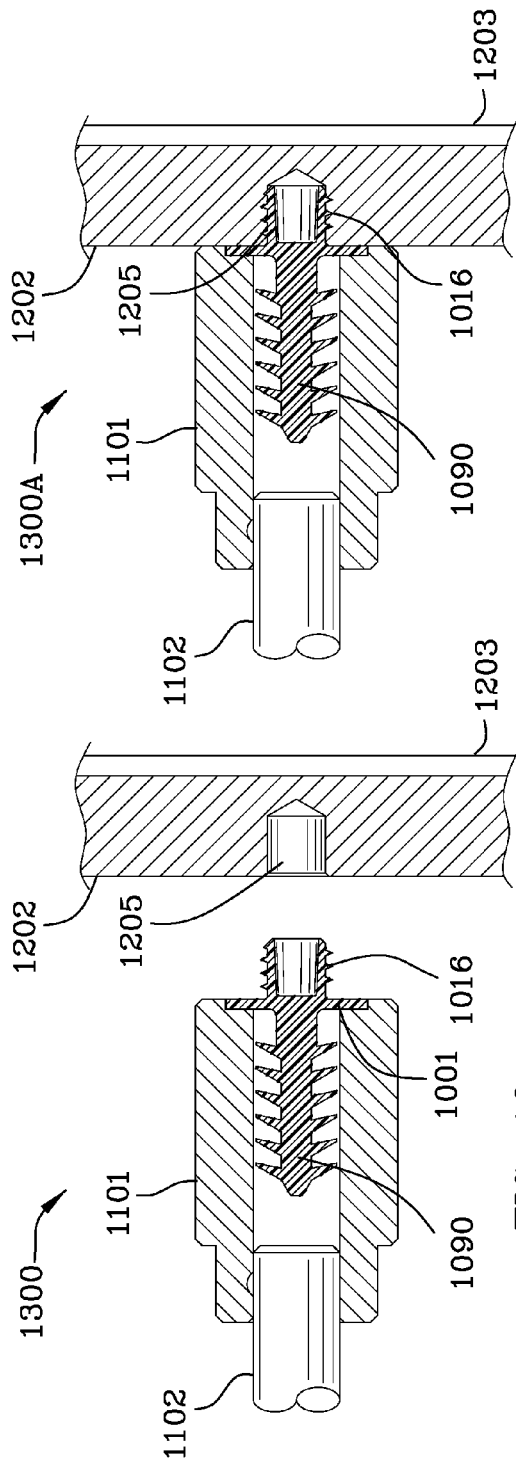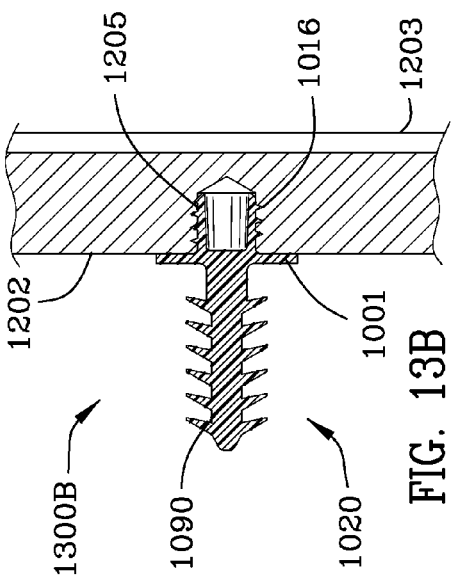

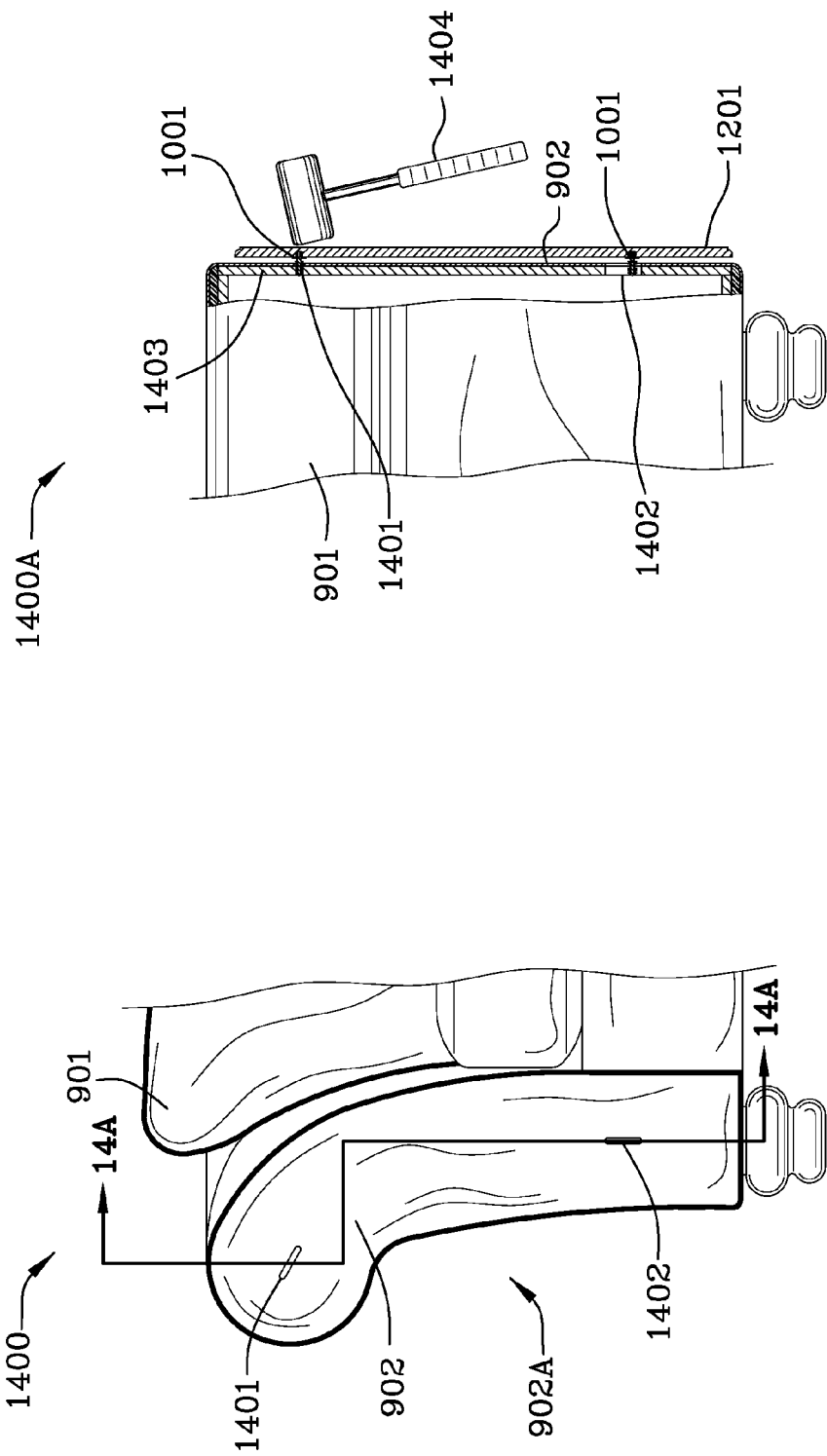

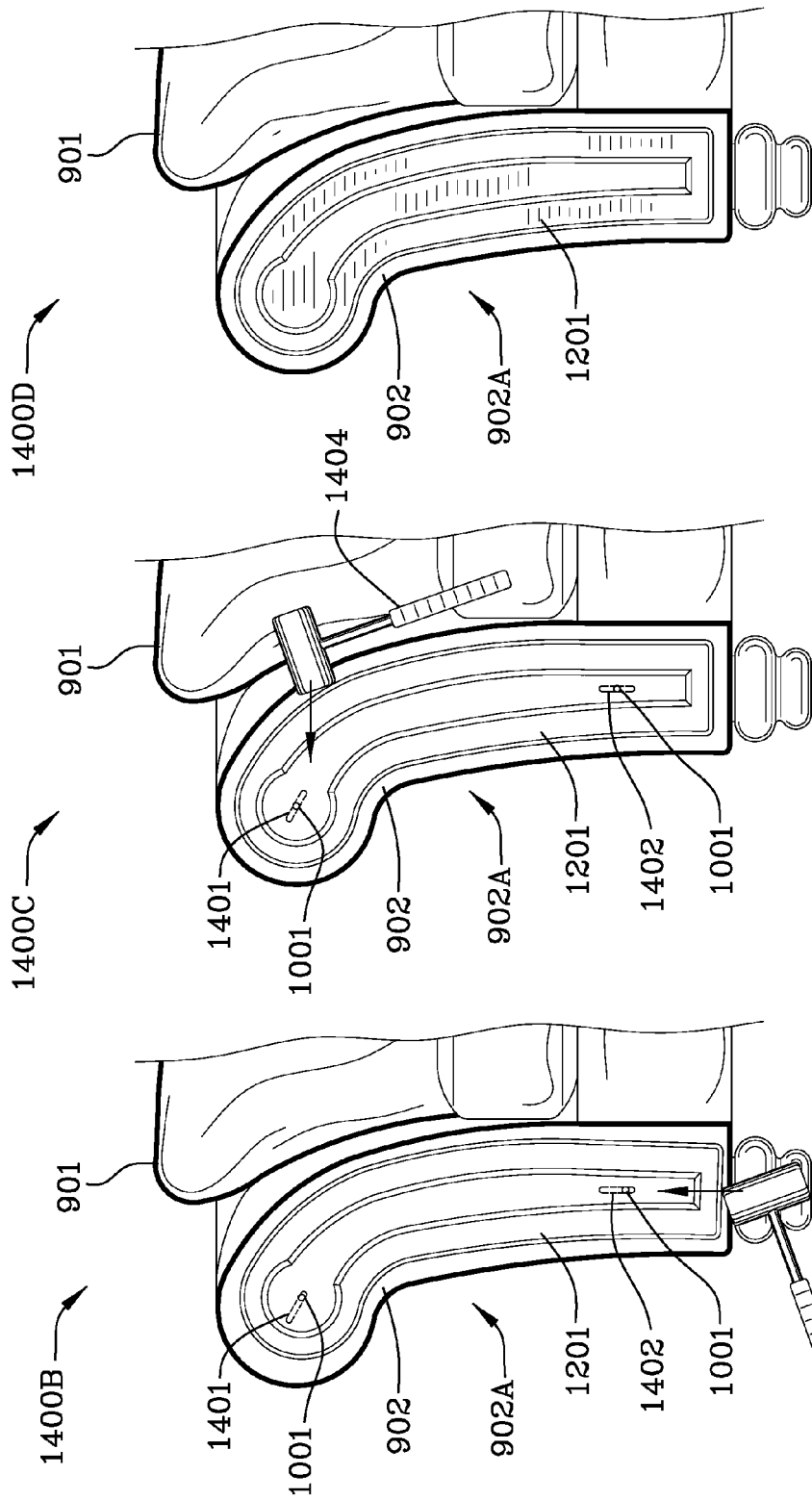

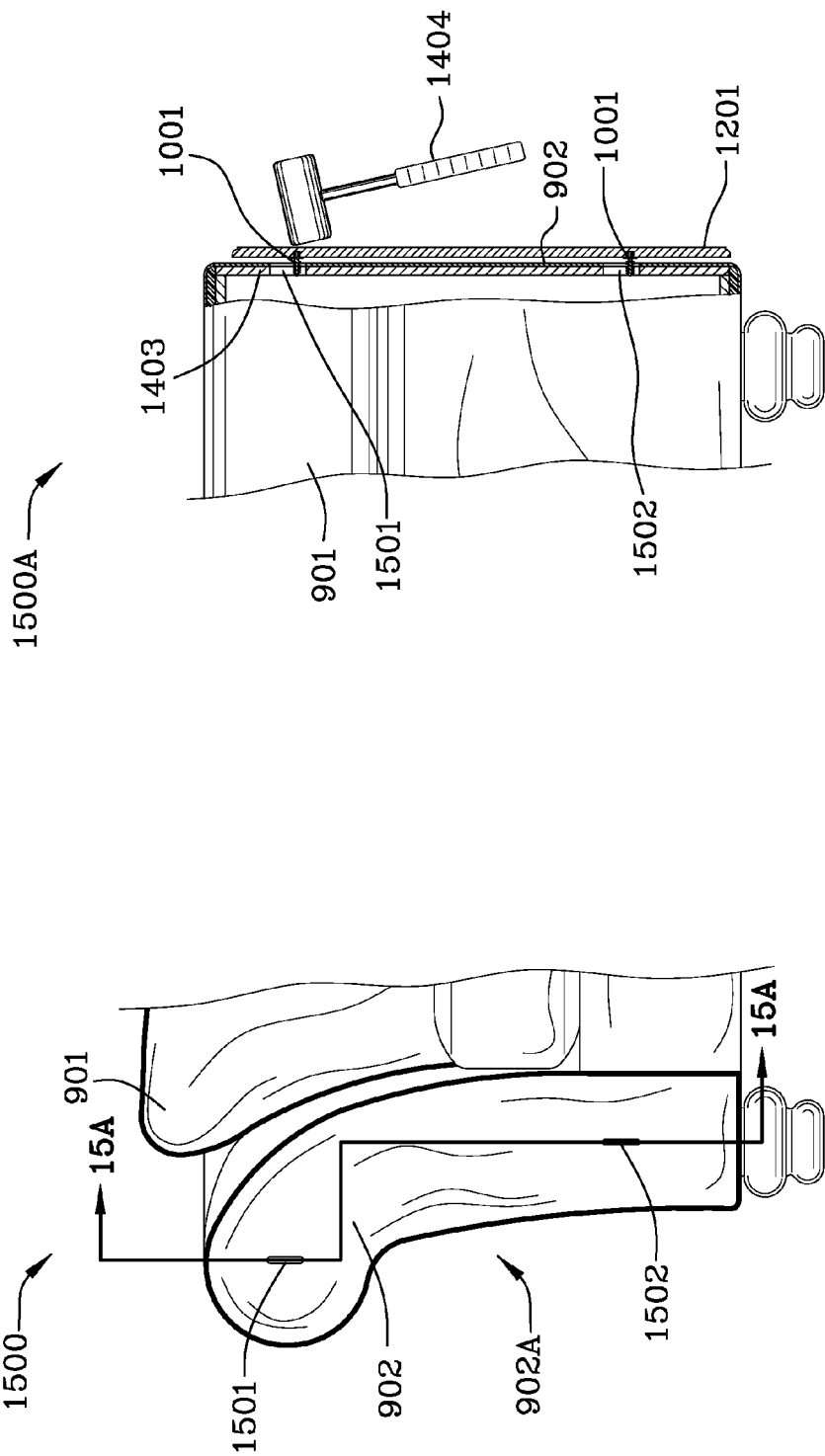

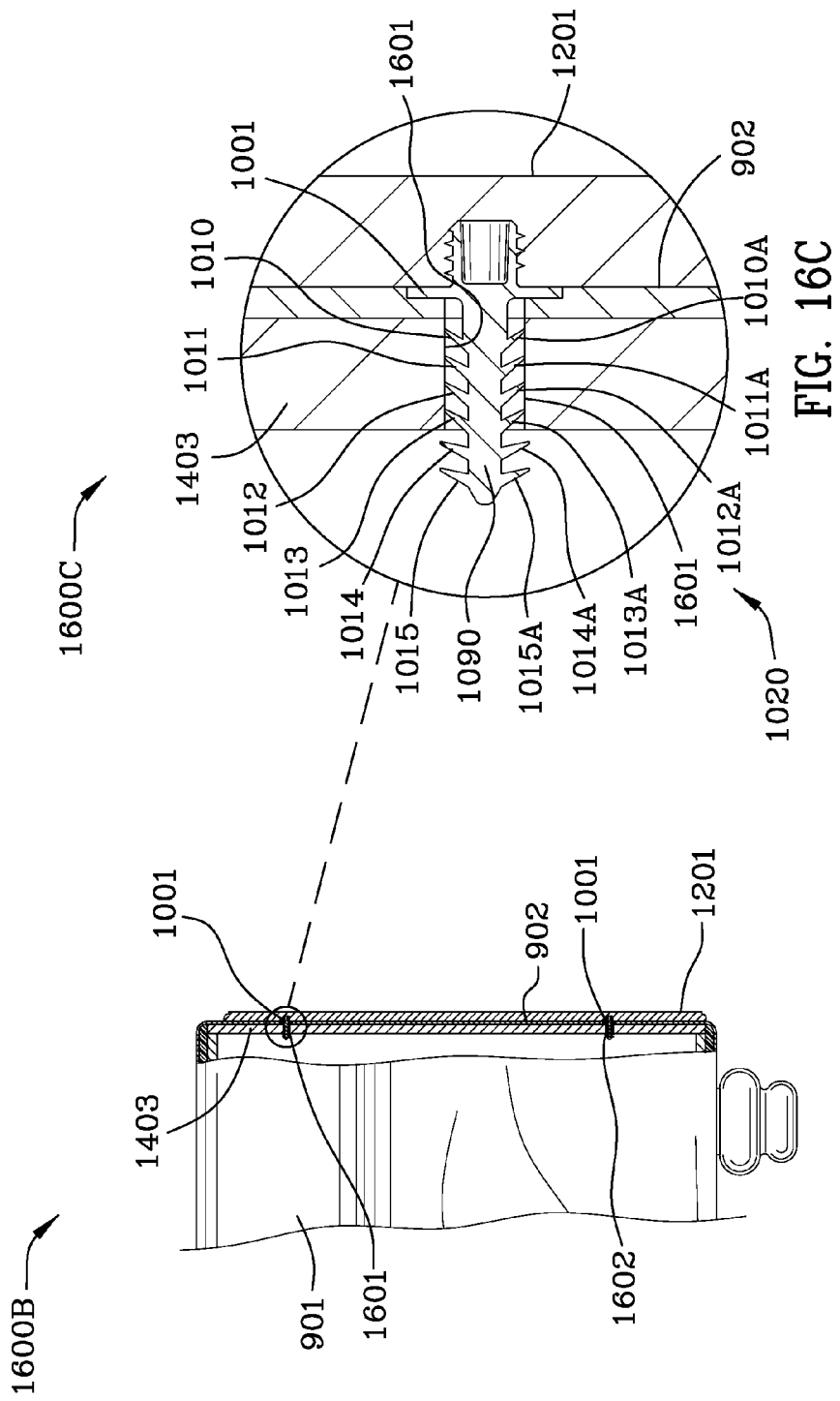

FASTENER

FIELD OF THE INVENTION

The invention is in the field of fasteners used to attach ornamental (trim) pieces of wood to furniture.

BACKGROUND OF THE INVENTION

FIG. 1 is a side view 100 of the prior art barbed plate 101. Barbs 102, 103 and 104 are shown protruding from plate 101. Barbs 102, 103 and 104 are formed by punching the plate with a die and then bending the barbs 102, 103 and 104 to protrude at an angle of approximately 90° with respect to the plate. FIG. 1A is a front side view 100A of the prior art barbed plate 101.

FIG. 2 is a view 200 of the rear face (inner side) of an ornamental piece 201 of wood employing the prior art barbed plate 101 affixed thereto with staples 204. Openings (unnumbered) are created by bending barbs 102, 103, and 104 upwardly and then the openings provide room for staples 204 to attach the barbed plates 101 to the ornamental piece of wood 201. Inner side 202 of the ornamental piece of wood 201 is affixed to a furniture substrate/upholstery as described hereinbelow.

FIG. 2A is an enlargement 200A of a portion of FIG. 2 illustrating staples 204 attaching the prior art barbed plate 101 to the rear face 202 of the ornamental piece of wood 201. FIG. 2B is a side view 200B of the prior art barbed plate 101 attached to the rear face 202 of the ornamental piece of wood 201. The outer side 203 of the wood is illustrated in FIG. 2B. Outer side 203 includes a decorative feature (not shown) to enhance the appearance of the furniture.

FIG. 2C is an enlargement 200C of a portion of FIG. 2B illustrating the prior art barbed plate 101 stapled 204 to the rear of the ornamental piece of wood 201.

FIG. 3 is an exploded side view 300 of the furniture arm rest and the ornamental wood piece 201 having the prior art barbed plates 101 affixed thereto. Reference numeral 301 is used to denote the top of the furniture arm. FIG. 3A is an enlarged portion 300A of FIG. 3 illustrating the upholstery 302 covering the furniture substrate 303. Substrate 303 forms the front face of the furniture arm.

FIG. 4 is a side view 400 of the furniture arm rest partially cut away illustrating the ornamental wood piece 201 attached to the furniture substrate 303 of the furniture arm rest using the prior art barbed plates 101. Upholstery 302 is interposed between the ornamental wood pieces 201 and the furniture substrate 303. In practice, a rubber mallet 402 is used to lightly hammer (urge) the ornamental piece of wood 201 into the furniture substrate 303 causing the barbs to pierce the upholstery 302 and interengage substrate 303. A rubber mallet does not destroy the ornamentation on the outer surface 203 of the ornamental piece of wood 201. FIG. 4A is an enlarged portion 400A of a portion of FIG. 4 illustrating one of the barbs 103 deformed and not fully engaging the wood substrate 303. FIG. 4B is a front end view 400B of the furniture arm of FIG. 4 illustrating misalignment of the ornamental piece of wood 201 using the prior art barbed plate to attach the ornamental piece to the substrate 103. Two problems exist using the prior art barbed plate. First, the barbs sometimes bend during insertion into the furniture substrate such that they do not properly secure the ornamental piece to the substrate as illustrated in FIG. 4A and the ornamental piece of wood may become loose or later pried off by children. Second, the ornamental piece of wood may not be aligned well as illustrated in FIG. 4B making the furniture unattractive.

FIG. 5 is an end view 500 of a prior art Christmas tree fastener which includes a flange 501, a first Christmas tree portion for engaging the ornamental piece of wood 502, and a second Christmas tree portion 503 for engaging the furniture substrate. FIG. 5A is a side view 500A of the prior art Christmas tree fastener of FIG. 5. Typically the prior art Christmas tree fastener is made of plastic.

FIG. 6 is a view 600 of the rear face 602 of an ornamental piece of wood 601 with the prior art Christmas tree fastener (501, 502, 503) of FIG. 5 inserted therein. Rear (inner) side 602 includes apertures 604, 605 for reception of the second Christmas tree portion 503 of the prior art Christmas tree fastener. FIG. 6A is a side view 600A of the ornamental piece of wood 601 with the prior art Christmas tree fastener of FIG. 5 inserted therein. Reference numeral 603 in this example of the prior art is used to denote the outside of the ornamental piece of wood.

FIG. 7 is an end view 700 of an arm rest illustrating two apertures 703, 704 therein for receiving the Christmas tree fasteners of FIG. 5. Reference numeral 701 signifies the top of the arm rest. Referring to FIGS. 7, 8 and 8A, a layer of upholstery 702 covers the arm rest. FIG. 8 is a side view 800 of an arm rest with an ornamental piece of wood 601 positioned for attachment to the furniture substrate 801 of the arm rest with the Christmas tree fasteners 503, 503 misaligned with respect to the apertures 703, 704 in which it fits. FIG. 8A is a front view 800A of the arm rest illustrating misalignment (in phantom) of the Christmas tree fastener 503 and the upper hole/aperture 703 in the arm rest. In this example of the prior art, the ornamental piece of wood 601 cannot be installed into the furniture substrate 801 due to the misalignment of the Christmas tree fastener 503 with respect to the upper hole/aperture 703. In this example of the prior art, the ornamental piece of wood 601 must be removed and a new aperture must be drilled in the ornamental piece of wood 601 and the Christmas tree fastener (501, 502, 503) must be removed and reinstalled. Further, it may be difficult to remove the Christmas tree fastener (501, 502, 503) from the ornamental piece of wood 601 because the first Christmas tree portion 502 is forcefully jammed into the aperture and it may break upon removal or attempted removal.

SUMMARY OF THE INVENTION

A fastener in combination with an ornamental piece of wood and a furniture substrate is disclosed and claimed. The fastener includes a first Christmas tree portion with branches. Each of the branches of the first Christmas tree portion of the fastener includes an arc-shaped end surface. The fastener also includes a threaded portion. Still further, the fastener includes a flange portion positioned intermediate the first Christmas tree portion and the threaded portion. The ornamental piece of wood includes an aperture therein. The threaded portion of the fastener is threaded into the aperture in the ornamental piece of wood. The flange of the fastener engages the ornamental piece of wood. The furniture substrate includes a slot therein. The first portion of the fastener interengages the slot in the furniture substrate securing the ornamental piece of wood to the furniture substrate. The first portion of the fastener is slidable with respect to the slot positioning the ornamental piece of wood with respect to the furniture substrate.

The first Christmas tree portion of the fastener includes a shaft and the branches of the first portion of the fastener are deformable and are spaced circumferentially about the shaft. The arc-shaped end surface of each of the branches extend radially equidistantly. Preferably the flange is hexagonally shaped. Preferably the branches are arranged in rows and the circumferential spacing of the branches include right angle gaps therebetween enabling the branches to fold inwardly and to resist extraction from the slot.

An ornamental piece of wood affixed to a furniture substrate is also disclosed and claimed. A first fastener includes a first portion. The first portion of the first fastener includes branches. A second fastener also includes a first portion. The first portion of the second fastener includes branches. Branches of the first portion of the first fastener include arc-shaped end surfaces and branches of the first portion of the second fastener include arc-shaped end surfaces. The first fastener includes a threaded portion and the second fastener includes a threaded portion. The first fastener includes a flange portion positioned intermediate the first portion and the threaded portion. The second fastener includes a flange portion positioned intermediate the first portion and the threaded portion. An ornamental piece of wood for attachment to and decoration of the furniture includes a first aperture and a second aperture therein. The threaded portion of the first fastener is threaded into the first aperture in the ornamental piece of wood. The flange of the first fastener engages the ornamental piece of wood.

The threaded portion of the second fastener is threaded into the second aperture in the ornamental piece of wood. The flange of the second fastener engages the ornamental piece of wood. The furniture substrate includes a first slot and a second slot therein. The first portion of the first fastener interengages the first slot in the furniture substrate and the second portion of the second fastener interengages the second slot in the furniture substrate securing the ornamental piece of wood to the furniture substrate.

The first portion of the first fastener is slidable with respect to the first slot in the furniture substrate and the second portion of the second fastener is slidable with respect to the second slot in the furniture substrate positioning the ornamental piece of wood with respect to the furniture substrate.

The first and second slots in the furniture substrate may be vertical slots. Alternatively, the first and second slots in the furniture substrate are horizontal slots. Another alternative includes the option where the first slot is a vertical slot and the second slot is a sloped slot.

The first portion of the first fastener includes a shaft and the branches of the first portion of the first fastener are spaced circumferentially about the shaft with gaps therebetween. The first portion of the second fastener includes a shaft and the branches of the first portion of the second fastener are spaced circumferentially about the shaft with gaps therebetween. Branches of the first portion of the first and second fasteners are deformable. The arc-shaped end surface of each of the branches extends radially equidistantly. Flanges of the first and second fasteners are hexagonally shaped. Branches of the first and second fasteners are arranged in rows and the circumferential spacing of the branches includes gaps therebetween enabling the branches to fold inwardly and to resist extraction from the slots.

A first method for attaching an ornamental piece of wood to a furniture substrate is also disclosed and claimed. The first method uses a fastener and the fastener includes a first portion. The first portion of the fastener includes branches and each of the branches of the first portion of the fastener include an arc-shaped end surface, the arc-shaped end surface of each of the branches extending radially equidistantly. The fastener includes a threaded portion and the fastener includes a flange portion positioned intermediate the first portion and the threaded portion. The ornamental piece of wood includes an aperture therein. The furniture substrate includes a slot therein which extends through the substrate. The first method includes the steps of: threading the threaded portion of the fastener into the aperture in the ornamental piece of wood until the flange of the fastener engages the ornamental piece of wood; interengaging the first portion of the fastener with the slot in the furniture substrate securing the ornamental piece of wood to the furniture substrate; and, slidably positioning the first portion of the fastener with respect to the slot and arranging the ornamental piece of wood with respect to the furniture substrate.

A second method for attaching an ornamental piece of wood to a furniture substrate is also disclosed and claimed. The second method uses a first fastener and a second fastener. The first fastener includes a first portion and the second fastener includes a first portion. The first portion of the first fastener includes branches. The first portion of the second fastener includes branches. Each of the branches of the first portion of the first fastener include an arc-shaped end surface. Each of the branches of the first portion of the second fastener include an arc-shaped end surface. The arc-shaped end surfaces of the branches of the first portion of the first fastener extend radially equidistantly. The arc-shaped end surfaces of the branches of the first portion of the second fastener extend radially equidistantly. The first fastener includes a threaded portion and the second fastener includes a threaded portion. The first fastener includes a flange portion positioned intermediate the first portion and the threaded portion. The second fastener includes a flange portion positioned intermediate the first portion and the threaded portion. The ornamental piece of wood includes first and second apertures therein. Alternatively, an ornamental piece of plastic or an ornamental composite of plastic and wood many be used. The furniture substrate includes first and second slots therein and therethrough. The second method comprises the steps of: threading the threaded portion of the first fastener into the first aperture in the ornamental piece of wood until the flange of the fastener engages the ornamental piece of wood; threading the threaded portion of the second fastener into the second aperture in the ornamental piece of wood until the flange of the fastener engages the ornamental piece of wood; interengaging the first portion of the first fastener with the first slot in the furniture substrate and interengaging the first portion of the second fastener with the second slot in the furniture substrate securing the ornamental piece of wood to the furniture substrate; and, slidably positioning the first portion of the first fastener with respect to the first slot and slidably positioning the second portion of the second fastener slidably with respect to the second slot arranging the ornamental piece of wood with respect to the furniture substrate.

BRIEF DESCRIPTION OF THE DRAWINGS

FIG. 1 is a side view of the prior art barbed plate.

FIG. 1A is a front side view of the prior art barbed plate.

FIG. 2 is a view of the rear face (rear side) of an ornamental piece of wood employing the prior art barbed plate affixed thereto.

FIG. 2A is an enlargement of a portion of FIG. 2 illustrating staples attaching the prior art barbed plate to the rear face of the ornamental piece of wood.

FIG. 2B is a side view of the prior art barbed plate attached to the ornamental piece of wood.

FIG. 2C is an enlargement of a portion of FIG. 2B illustrating the prior art barbed plate stapled to the rear portion of the ornamental piece of wood.

FIG. 3 is an exploded side view of the furniture arm rest and the ornamental wood piece having the prior art barbed plates affixed thereto.

FIG. 3A is an enlarged portion of FIG. 3 illustrating the upholstery covering the furniture substrate.

FIG. 4 is a side view of the furniture arm rest partially cut away illustrating the ornamental wood piece attached to the furniture arm rest using the prior art barbed plates.

FIG. 4A is an enlarged portion of a part of FIG. 4 illustrating one of the barbs deformed and not fully engaging the wood substrate.

FIG. 4B is an end view of the furniture arm of FIG. 4 illustrating misalignment of the ornamental piece of wood using the prior art barbed plate.

FIG. 5 is an end view of a prior art Christmas tree fastener.

FIG. 5A is a side view of the prior art Christmas tree fastener of FIG. 5.

FIG. 6 is a view of the rear face of an ornamental piece of wood with the prior art Christmas tree fastener of FIG. 5 inserted therein.

FIG. 6A is a side view of the ornamental piece of wood with the prior art Christmas tree fastener of FIG. 5 inserted therein.

FIG. 12 is a rear view of the ornamental piece of wood with two apertures therein.

FIG. 12A is a side view of the ornamental piece of wood of FIG. 12.

FIG. 12B is a front view of the ornamental piece of wood.

FIG. 12C is a cross-sectional view taken along the lines 12C-12C of FIG. 12A illustrating a receptacle for interengagement with the fastener.

FIG. 13 is a cross-sectional view of the fastener residing partially within a socket spaced apart from the receptacle in the ornamental piece of wood.

FIG. 13A is a cross-sectional view of the fastener threadedly interengaging the ornamental piece of wood with the socket surrounding the Christmas tree portion of the fastener.

FIG. 13B is a cross-sectional view of the fastener threadedly interengaging the ornamental piece of wood.

FIG. 14 is a front view of an arm rest illustrating a vertical slot and a sloped slot therein.

FIG. 14A is a left side and partial cross-sectional view taken along the lines 14A-14A of FIG. 14 view of an arm rest illustrating partial insertion of a first fastener in the vertical slot and partial insertion in a second fastener in the sloped slot.

FIG. 14B is a front view of an arm rest illustrating in phantom the position of the first fastener in the vertical slot and the position of the second fastener in the sloped slot with a positional adjustment being made with a rubber mallet.

FIG. 14C is a front view of an arm rest illustrating in phantom the position of the first fastener in the vertical slot and the position of the second fastener in the sloped slot with another positional adjustment being made with a rubber mallet.

FIG. 14D is a front view of the arm rest illustrating the ornamental wood piece in its final position securely fastened to the substrate.

FIG. 15 is a front view of an arm rest illustrating a first vertical slot and a second vertical slot.

FIG. 15A is a cross-sectional view taken along the lines 15A-15A of FIG. 15.

FIG. 16B is a cross-sectional view illustrating the interengagement of the ornamental piece of wood with the substrate without a gap therebetween.

FIG. 16C is an enlargement of a portion of FIG. 16B illustrating interengagement of the Christmas tree portion of the fastener with the upper horizontal slot.

DESCRIPTION OF THE INVENTION

Figure 9:
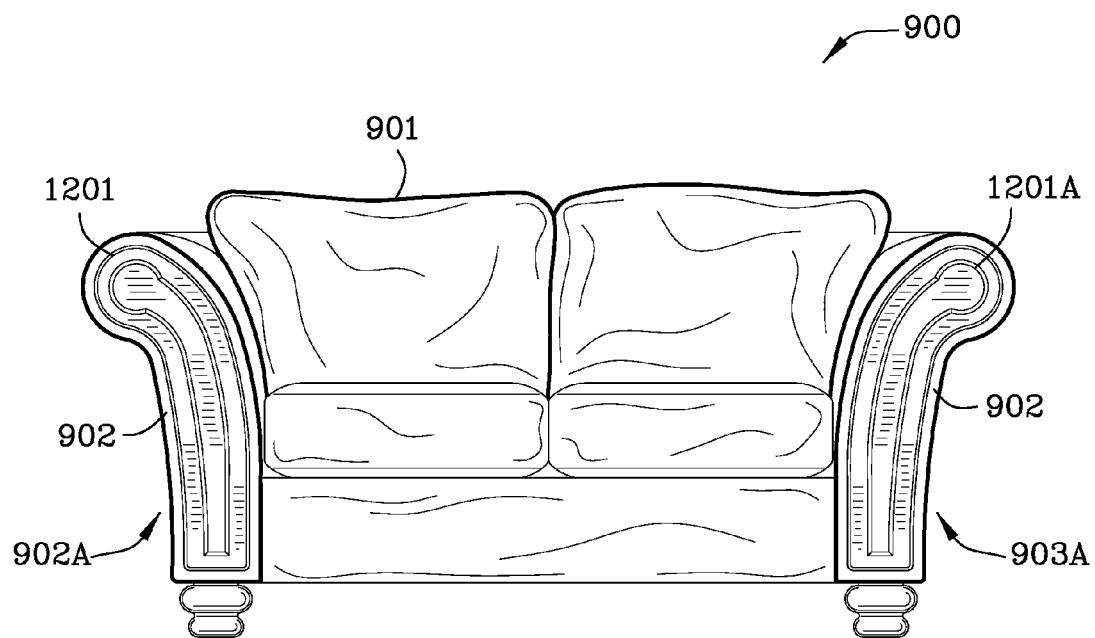
FIG. 9 is a front view of a couch illustrating the arm rests with the ornamental pieces of wood thereon.
Figure 9A:
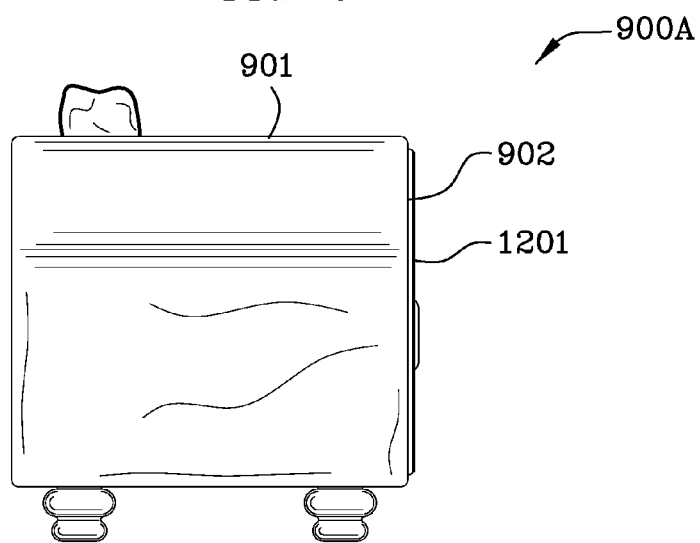
FIG. 9A is a left side view of the arm rest illustrating the ornamental piece of wood attached thereto.

FIG. 9 is a front view 900 of a couch illustrating the arm rests 902A, 903A with the ornamental pieces 1201, 1201A of wood thereon. Reference numeral 902 represents the arm rests covered with upholstery such as a leather upholstery. Reference numeral 901 illustrates the rear (back) cushions of the couch. FIG. 9A is a left side view 900A of the arm rest 902A illustrating the ornamental piece of wood 1201 attached thereto.

Figures 10, 10A:
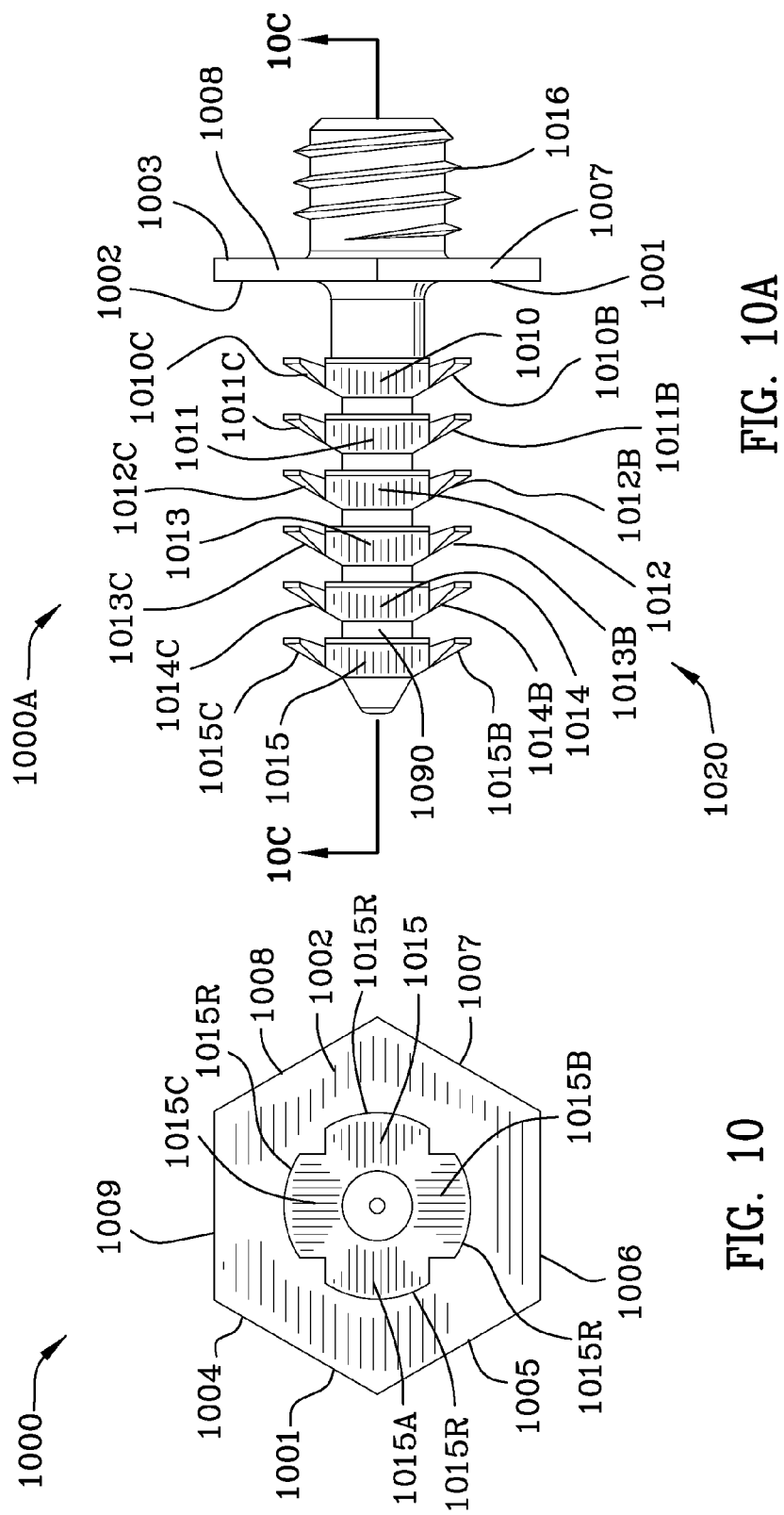
FIG. 10 is a top end view of the fastener.
FIG. 10A is a side view of the fastener illustrating a Christmas tree portion, a flange portion, and a threaded portion.

FIG. 10 is a top end view 1000 of the novel fastener illustrating branches 1015, 1015A, 1015B and 1015C. Each of the branches 1015, 1015A, 1015B and 1015C include arc-shaped end surfaces 1015R which extend equidistantly from the center of the shaft 1090. Plate/flange 1001 is hexagonally shaped and hexagonal surfaces 1004, 1005, 1006, 1007, 1008 and 1009 are illustrated in FIG. 10.

Figure 10C:
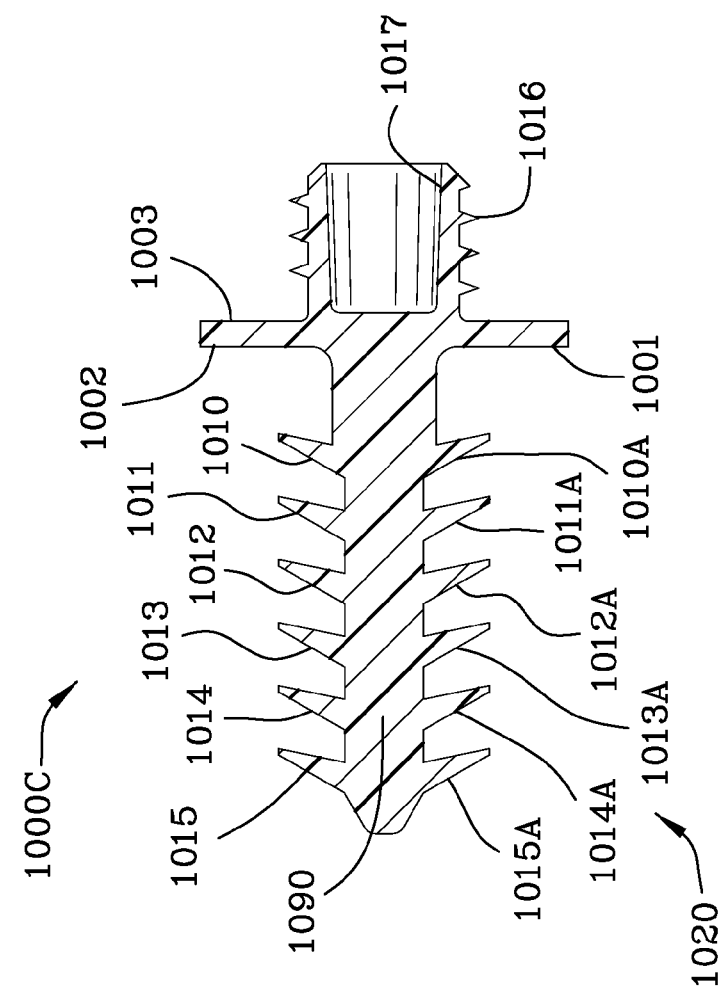
FIG. 10C is a cross-sectional view taken along the lines 10C-10C of FIG. 10A.

FIG. 10A is a side view 1000A of the fastener illustrating a Christmas tree portion 1020, a flange portion 1001, and a threaded portion 1016. The material of the fastener is molded plastic, has a black semi-gloss finish, and has a Rockwell Hardness on the R Scale of between 90-112. The material may be a nylon 6/6 with 20% impact modifier may be used. These materials and dimensions set forth herein are by way of example only and many other materials and many dimensions may be used. The nominal length of the fastener is 1.595 inches. The Christmas tree portion 1020 is approximately 1.16 inches in length, the flange portion 1001 is approximately 0.06 inches in length, and the threaded portion 1016 is approximately 0.375 inches in length. FIG. 10A illustrates a row of branches 1015, 1015B, 1015C spaced apart from the next closest row 1014, 1014B, 1014C. Branches 1015A and 1014A are not illustrated in FIG. 10A but are illustrated in FIG. 10C. FIG. 10C is a cross-sectional view 1000C taken along the lines 14C-14C of FIG. 10A and illustrates branches 1015A, 1014A, 1013A, 1012A, 1011A, and 1010A.

Referring to FIG. 10A, additional rows of branches: 1013, 1013B, 1013C; 1012, 1012B, 1012C; 1011, 1011B, 1011C; and, 1010, 1010B, 1010C; are illustrated. The branches are angled with respect to shaft 1090 at an angle of approximately 30° with respect to a line normal (perpendicular) to the shaft 1090. Branch diameter is approximately 0.50 inches and the shaft diameter is approximately 0.187 inches in diameter. It will be noticed that the shaft having a diameter of 0.50 inches extends into a larger diameter shaft of approximately 0.250 inches proximate flange 1001. Each branch is 0.073 inches thick proximate shaft 1090 and becomes progressively thinner toward end surface 1015R where it is 0.150 inches thick. In regard to the threaded portion 1016, the outer thread diameter is 0.45 inches thick. A gap (unnumbered) between branches 1010, 1010A, 1010B, 1010C and flange 1001 exists and is approximately 0.208 inches. Flange 1001 is approximately 0.875 inches from edge 1009 to edge 1006. The dimensions and the materials of the fastener illustrated in FIGS. 10, 10A, 10B and 10C are by way of example only and those skilled in the art will readily recognize that changes may be made to the materials and dimensions set forth herein without departing from the spirit and scope of the invention as set forth below in the claims.

Figure 10B:
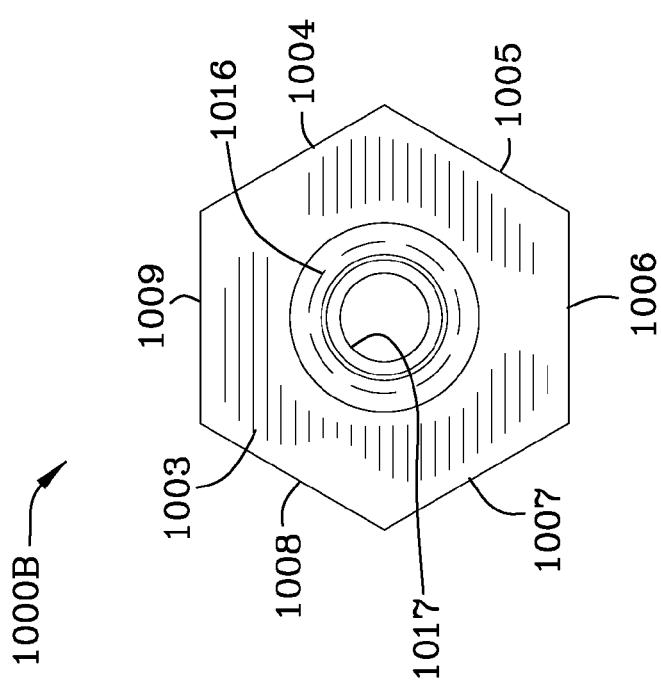
FIG. 10B is bottom end view of the fastener.

Still referring to FIG. 10A, plate/flange 1001 includes first surface 1002 of hexagonally shaped plate which adjustably interengages the upholstery/furniture substrate when pushed therein as described hereinbelow in more detail. Hexagonally shaped flange 1001 from edge 1009 to edge 1006 measures approximately 0.875 inches which is larger than the width of any slot into which the Christmas tree portion 1020 of the fastener is inserted. Hexagonally shaped plate/flange 1001 includes a second surface 1003 which abuts the ornamental wood piece when screwed therein as described hereinbelow in more detail. FIG. 10B is bottom end view 1000B of the fastener and illustrates the hexagonal surfaces of the plate 1001 along with the interior 1017 of the threaded end portion.

Figures 11, 11A:
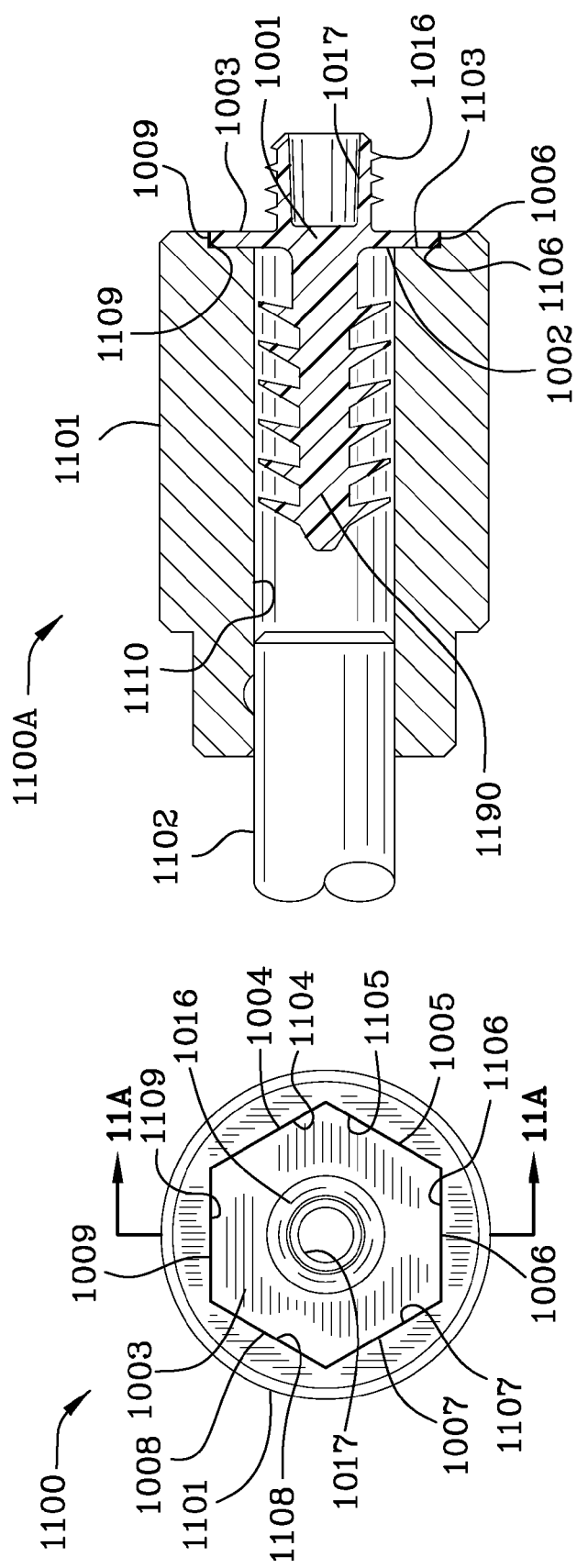
FIG. 11 is an end view of a socket engaging the fastener.
FIG. 11A is a cross-sectional view of the fastener taken along the lines 11A-11A of FIG. 11.

FIG. 11 is an end view 1100 of a socket 1101 engaging the fastener. Socket 1101 is used to insert the fastener into an aperture in the ornamental substrate. FIG. 11A is a cross-sectional view 1100A of the fastener taken along the lines 11A-11A of FIG. 11. Hexagonal socket 1101 is driven by socket drive shaft 1102. Hexagonal socket 1101 includes a bore 1110 for receiving the Christmas tree portion 1020 of the fastener and the socket further includes a seat 1103 which engages the first surface 1002 of the fastener. Hexagonal socket 1101 further includes hexagonal socket surfaces 1104, 1105, 1106, 1107, 1108, 1109 which interengage corresponding hexagonal surfaces 1004, 1005, 1006, 1007, 1008, 1009. Socket 1101 is used to rotate the fastener driving threads 1016 into apertures 1204, 1205 as illustrated in FIG. 12.

FIG. 12 is a rear view 1200 of the ornamental piece of wood 1201 with two apertures 1204, 1205 in the rear side 1202 thereof. FIG. 12A is a side view 1200A of the ornamental piece of wood 1201 of FIG. 12 illustrating the front ornamented side 1203 and the rear side 1202 which is attached to the furniture. FIG. 12B is a front view 1200B of the ornamental piece of wood 1201 illustrating the front surface 1203 thereof. The ornamental piece does not necessarily have to be made of wood and may be a plastic or other material or a composite of plastic and wood.

FIG. 12C is a cross-sectional view 1200C taken along the lines 12C-12C of FIG. 12A illustrating a receptacle/aperture 1205 for interengagement with the threaded end portion 1016 of the fastener. Alternatively, the receptacle/aperture 1205 may be threaded.

FIG. 13 is a cross-sectional view 1300 of the fastener residing partially within socket 1101 spaced apart from the receptacle 1205 in the ornamental piece of wood 1201. FIG. 13A is a cross-sectional view 1300A of the fastener threadedly 1016 interengaging the ornamental piece of wood 1201 from the rear with the socket 1101 surrounding the Christmas tree portion of the fastener. As illustrated in FIG. 13A, the socket has rotated the fastener and the threads 1016 interengage the ornamental piece of wood or other suitable material. The fastener is preferably made of a hard plastic (which may include an impact modifier) enabling the threads 1016 to mate with different materials used as ornamental (trim) pieces of furniture. FIG. 13B is a cross-sectional view 1300B of the fastener threadedly interengaging the ornamental piece of wood 1201 with the socket 1101 removed.

FIG. 14 is a front view 1400 of an arm rest 902A illustrating a vertical slot 1402 and a sloped slot 1401 in the furniture substrate 1403. The furniture substrates as described herein may be 0.50 inches thick nominally to 1.00 inches thick nominally and may be made of any type of wood, press wood or plywood. The slots in the furniture substrate are through slots meaning that they extend through the substrate. FIG. 14A is a left side view 1400A of an arm rest partially in cross section taken along the lines 14A-14A of FIG. 14 illustrating partial insertion of a first fastener 1001 in the sloped slot 1401 and partial insertion of a second fastener 1001 in the vertical slot 1402. Mallet 1404 is shown tapping the fasteners 1001, 1001 into the upper and lower slots of the furniture substrate 1403. As the rubber mallet 1404 is used, fasteners 1001, 1001 are driven into the slots 1401, 1402. The hexagonal flange surfaces 1002 of fasteners 1001, 1001 are larger than the slots 1401, 1402 and, therefore, cannot be over driven into the furniture substrate 1403. Mallet 1404 may be alternately used to tap one fastener into a slot followed by tapping the other fastener into its respective slot. Tapping is necessary because the branches of the Christmas tree portion 1020 of the fastener must be bent toward the shaft 1090 of the fastener as illustrated in FIG. 16C as the width of the slot is smaller than the nominal 0.500 inch diameter of the branches (as measured from one edge surface 1015R to the diametrically opposed surface 1015R). FIG. 14B is a front view 1400B of an arm rest illustrating in phantom the position of the first fastener 1001 in the vertical slot 1402 and the position of the second fastener 1001 in the sloped slot 1401 with a positional adjustment being made with a rubber mallet 1404.

FIG. 14C is a front view 1400C of an arm rest illustrating in phantom another position of the first fastener 1001 in the vertical slot 1402 and another position of the second fastener 1001 in the sloped slot 1401 with another positional adjustment being made with the rubber mallet 1402. It will be noticed that the adjustments illustrated in FIG. 14B and FIG. 14C, result in positioning the ornamental piece 1201 with respect to the front 902A of the furniture. Once in position, the ornamental piece 1201 will not move during normal use and wear of the furniture. FIG. 14D is a front view 1400D of the arm rest illustrating the ornamental wood piece in its final position securely fastened to the substrate. Use of the slots and fastener in FIG. 14 eliminates the misalignment problems expressed in prior art FIGS. 5-8 and it eliminates the misalignment and engagement problems expressed in prior art FIGS. 1-4.

Figure 15C:
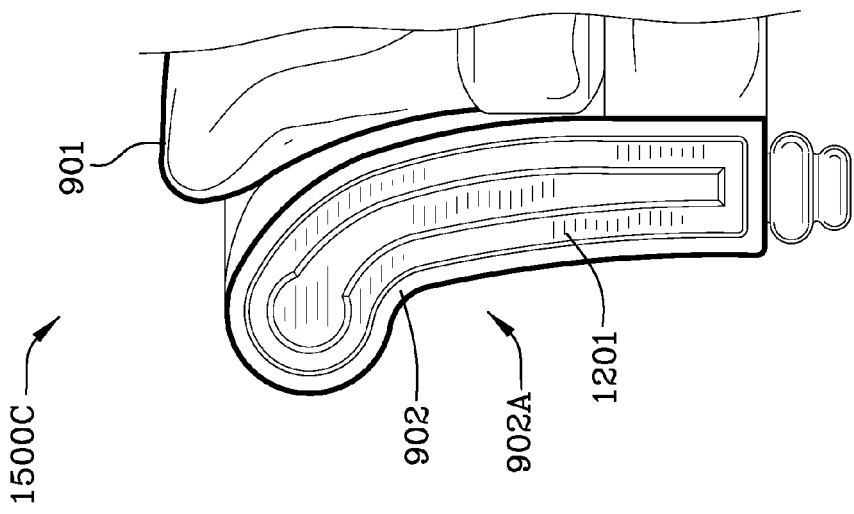
FIG. 15C is a front view of the arm rest illustrating the ornamental wood piece in its final position securely fastened to the substrate.
Figure 15B:
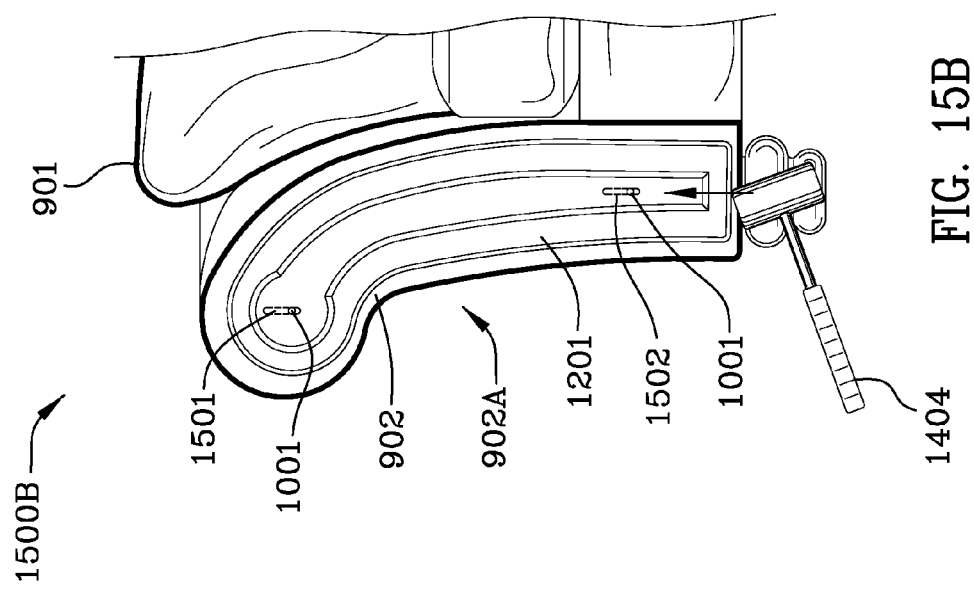
FIG. 15B is a front view of an arm rest illustrating (in phantom) the first fastener in the lower vertical slot and the second fastener in the upper slot with a positional adjustment being made with a rubber mallet.

FIG. 15 is a front view 1500 of an arm rest 902A illustrating a first upper vertical slot 1501 and a second lower vertical slot 1502. FIG. 15A is a cross-sectional view 1500A taken along the lines 15A-15A of FIG. 15. FIG. 15A illustrates the use of rubber mallet 1404 to tap the fasteners mounted into the ornamental piece 1201 into the first upper vertical slot 1501 and the second lower vertical slot 1502. As the rubber mallet 1404 is used, fasteners 1001, 1001 are driven into the slots 1501, 1502. The hexagonal flange surfaces 1002 of fasteners 1001, 1001 are larger than the slots 1501, 1502 and, therefore, cannot be over driven into the furniture substrate 1403. FIG. 15B is a front view 1500B of an arm rest illustrating the first fastener 1001 in the lower vertical slot 1502 and the second fastener 1001 in the upper slot 1501 with a positional adjustment being made with rubber mallet 1404. Reference numeral 902 in FIG. 15A is used to indicate the upholstery covering the furniture substrate 1403. FIG. 15C is a front view 1500C of the arm rest 902A illustrating the ornamental wood piece 1201 in its final position securely fastened to the substrate.

Figure 16A:
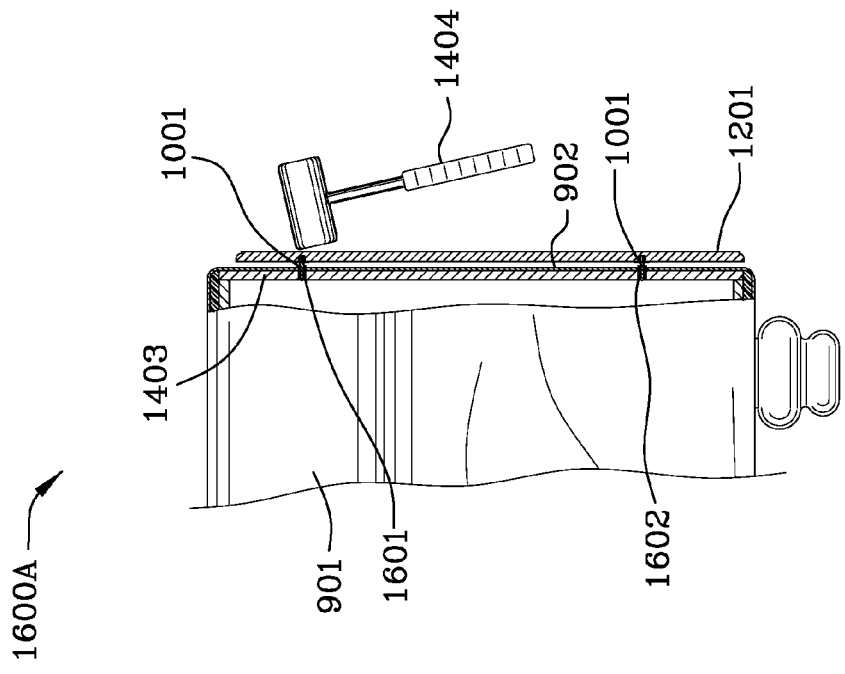
FIG. 16A is a cross-sectional view taken along the lines 16A-16A of FIG. 16.
Figure 16:
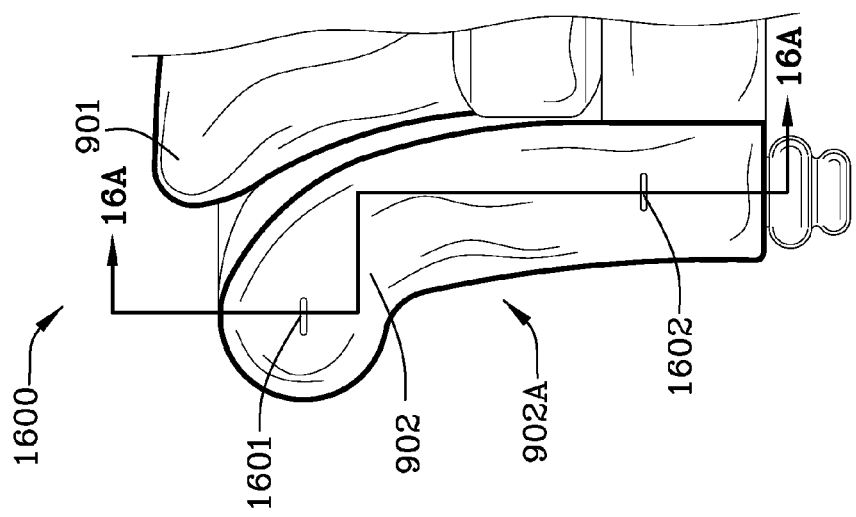
FIG. 16 is a front view of an arm rest illustrating a first horizontal slot and a second horizontal slot.
Figure 16D:
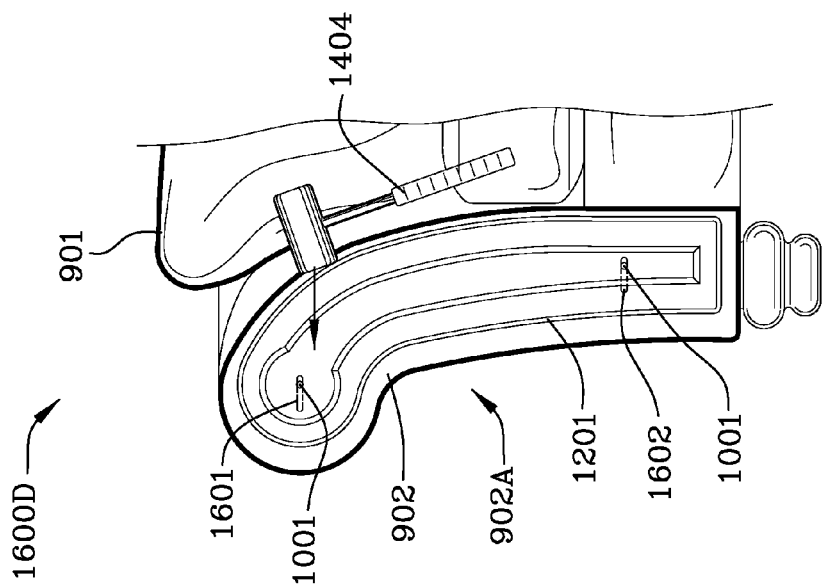
FIG. 16D is a front view of an arm rest illustrating the first fastener in the lower horizontal slot and the second fastener in the upper horizontal slot with a positional adjustment being made with a rubber mallet.

FIG. 16 is a front view 1600 of an arm rest 902A illustrating a first upper horizontal slot 1601 and a second lower horizontal slot 1602. FIG. 16A is a cross-sectional view 1600A taken along the lines 16A-16A of FIG. 16. FIG. 16A illustrates use of rubber mallet 1404 to tap ornamental piece 1201 into engagement with the upholstery 902 and wooden substrate 1403. As the rubber mallet 1404 is used, fasteners 1001, 1001 are driven into the slots 1601, 1602. The hexagonal flange surfaces 1002 of fasteners 1001, 1001 are larger than the slots 1601, 1602 and, therefore, cannot be over driven into the furniture substrate 1403. The ornamental piece 1201 snugly fits in engagement with the upholstery 902 and may compress it slightly if it is leather or a man-made upholstery. FIG. 16B is a cross-sectional view 1600B illustrating the interengagement of the ornamental piece of wood or other material 1201 with the upholstery 902/substrate 1403 without a gap therebetween. FIG. 16C is an enlargement 1600C of a portion of FIG. 16B illustrating interengagement of the Christmas tree portion 1020 of the fastener with the upper horizontal slot 1601. Branches 1010, 1010A, 1011, 1011A, 1012, 1012A, 1013, and 1013A are illustrated bent toward shaft 1090 after the ornamental substrate 1201 and Christmas tree portion 1020 of the fastener has been urged into engagement with the upholstery 902 and into the furniture substrate 1403. Although the branches identified are bent, the Christmas tree fastener may slide under the influence of force such as the mallet illustrated in FIG. 16D in the horizontal direction of slot 1601 as illustrated in FIG. 16. FIG. 16D is a front view 1600D of an arm rest 902A illustrating the first fastener in the first upper horizontal slot 1601 and the second fastener in the second lower horizontal slot 1602 with a positional adjustment being made with a rubber mallet. When the position adjustment is made, the branches 1010, 1010A, 1011, 1011A, 1012, 1012A, 1013, and 1013A which interengage the walls of the slot 1601 slide within the slot while preventing extraction of the fastener from the slot.

Figure 16E:
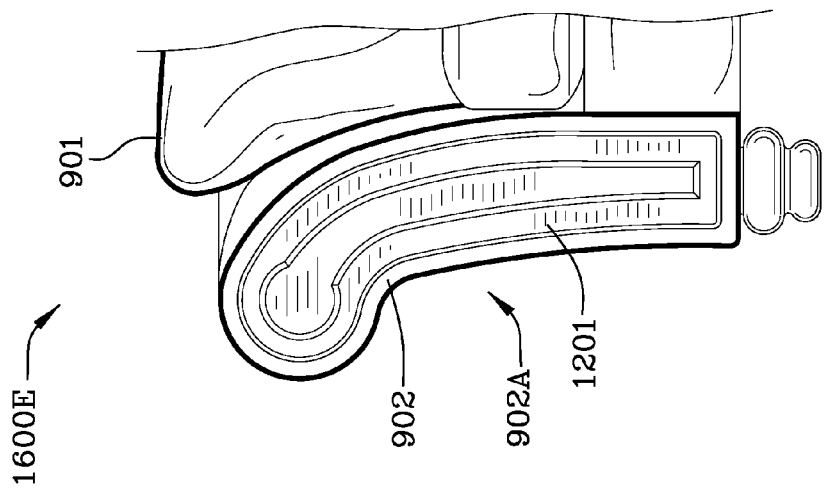
FIG. 16E is a front view of is a front view of an arm rest illustrating the ornamental wood piece in its final position securely fastened to the substrate.

FIG. 16E is a front view 1600E of arm rest 902A illustrating the ornamental wood piece 1201 (or other decorative piece made from a wood composite or plastic) in its final position securely fastened to the upholstery 902/substrate 1403.

A first method for attaching an ornamental piece of wood to a furniture substrate is also disclosed and claimed. The first method uses a fastener and the fastener includes a first portion. The first portion of the fastener includes branches and each of the branches of the first portion of the fastener include an arc-shaped end surface, the arc-shaped end surface of each of the branches extending radially equidistantly. The fastener includes a threaded portion and the fastener includes a hexagonally shaped flange portion positioned intermediate the first portion and the threaded portion. The ornamental piece of wood includes an aperture therein. The furniture substrate includes a slot therein. The first method includes the steps of: threading the threaded portion of the fastener into the aperture in the ornamental piece of wood until the flange of the fastener engages the ornamental piece of wood; interengaging the first portion of the fastener with the slot in the furniture substrate securing the ornamental piece of wood to the furniture substrate; and, slidably positioning the first portion of the fastener with respect to the slot and arranging the ornamental piece of wood with respect to the furniture substrate.

A second method for attaching an ornamental piece of wood to a furniture substrate is also disclosed and claimed. The second method uses a first fastener and a second fastener. The first fastener includes a first portion and the second fastener includes a first portion. The first portion of the first fastener includes branches. The first portion of the second fastener includes branches. Each of the branches of the first portion of the first fastener include an arc-shaped end surface. Each of the branches of the first portion of the second fastener include an arc-shaped end surface. The arc-shaped end surfaces of the branches of the first portion of the first fastener extend radially equidistantly. The arc-shaped end surfaces of the branches of the first portion of the second fastener extend radially equidistantly. The first fastener includes a threaded portion and the second fastener includes a threaded portion. The first fastener includes a flange portion positioned intermediate the first portion and the threaded portion. The second fastener includes a flange portion positioned intermediate the first portion and the threaded portion. The ornamental piece of wood includes first and second apertures therein. The furniture substrate includes first and second slots therein; comprising the steps of: threading the threaded portion of the first fastener into the first aperture in the ornamental piece of wood until the flange of the fastener engages the ornamental piece of wood; threading the threaded portion of the second fastener into the second aperture in the ornamental piece of wood until the flange of the fastener engages the ornamental piece of wood; interengaging the first portion of the first fastener with the first slot in the furniture substrate and interengaging the first portion of the second fastener with the second slot in the furniture substrate securing the ornamental piece of wood to the furniture substrate; and, positioning the first portion of the first fastener slidably with respect to the first slot and slidably positioning the second portion of the second fastener with respect to the second slot arranging the ornamental piece of wood with respect to the furniture substrate.

Both of the slots may be vertically oriented or both slots may be horizontally oriented. Another alternative is to orient one slot diagonally (sloped with horizontal and vertical components) and the other slot vertically oriented. Still alternatively both slots could be sloped.

REFERENCE NUMERALS

Figure 7:
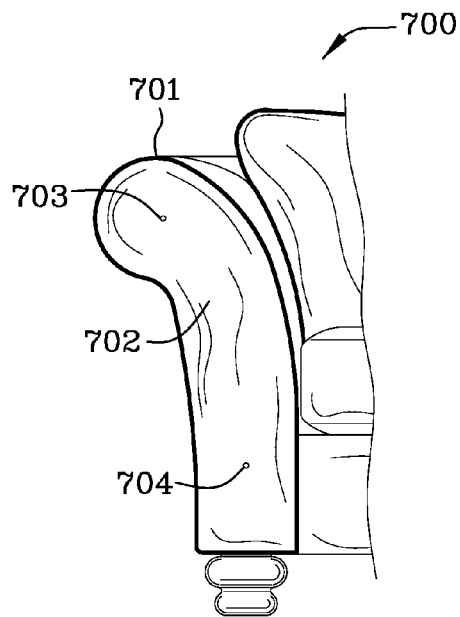
FIG. 7 is a front view of an arm rest illustrating two apertures therein for receiving the Christmas tree fasteners of FIG. 5.
Figure 8:
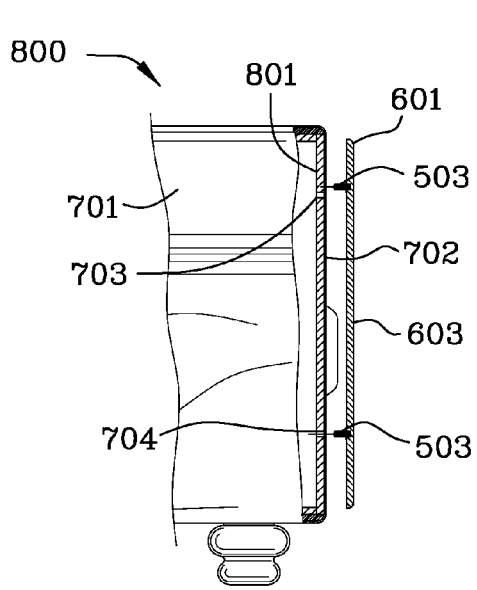
FIG. 8 is a side view of an arm rest with an ornamental piece of wood positioned for attachment to the arm rest with the Christmas tree fastener misaligned with respect to the apertures in which it fits.
Figure 8A:
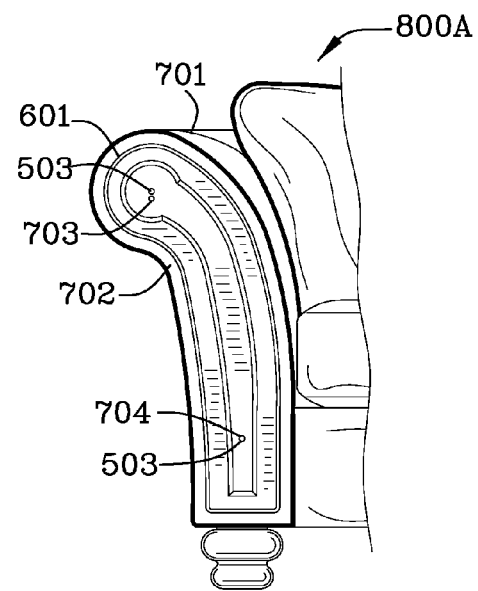
FIG. 8A is a front view of the arm rest illustrating misalignment of the Christmas tree fastener and the hole in the arm rest.

100—side view of prior art barbed plate
100A—front view of prior art barbed plate
101—prior art barbed plate
102, 103, 104—barb
200—inner (rear) side view of ornamental (decorative) piece of wood 200A—enlargement of a portion of FIG. 2 illustrating staples attaching the prior art barbed plate to the rear face of the ornamental piece of wood
200B—side view of the ornamental (decorative) piece of wood
200C—enlargement of a portion of the side view of the ornamental piece of wood illustrating the staple 204 attaching the prior art barbed plate to the wood
201—ornamental piece of wood
202—inner side of ornamental piece of wood
203—outer side of ornamental piece
204—staple
300—schematic exploded side view of furniture and ornamental piece of wood
300A—cut away view illustrating the end of the furniture arm and the covering thereover
301—top of furniture arm
302—upholstery covering substrate 303 forming end of furniture arm
303—furniture substrate forming the end of the furniture arm
400—assembled side schematic view of the furniture arm and ornamental wood piece
400A—enlargement of a portion of FIG. 4 illustrating one of the prongs in a deformed state not fully engaging the substrate 303
400B—front view of the ornamental wood piece misaligned
402—hammer
500—schematic of prior art Christmas tree fastener
500A—side view of the prior art Christmas tree of FIG. 5
501—plate
502—first Christmas tree portion for engaging the ornamental wood piece
503—second Christmas tree portion for engaging the substrate
600—inner side (rear side) of an ornamental wood piece employing the prior art fastener of FIG. 5
600A—side view of the ornamental wood piece and prior art fastener illustrated in FIG. 6
601—ornamental wood piece
602—inner (rear) side of ornamental/decorative wood piece
603—outer (front) side of ornamental/decorative wood piece
604, 605—apertures in ornamental wood piece which receive the first Christmas tree portion of the prior art fastener
700—front view of a furniture arm rest having apertures 703, 704 therein for receiving the first Christmas tree portion of the prior art fastener of FIG. 5
701—top of furniture arm rest
702—front face/surface of upholstery covering furniture arm rest
703, 704—corresponding receptacles/apertures in front face/surface of furniture arm rest into which Christmas tree fasteners 501 are supposed to fit but are not necessarily properly aligned
800—exploded partial cross-sectional side view of ornamental wood piece including prior art Christmas tree fasteners illustrating misalignment of the upper fastener (501, 502, 503) with respect to the upper aperture 703
800A—front view of FIG. 8 illustrating the misalignment of the upper fastener (501, 502, 503) with respect to the upper aperture 703
801—wooden substrate of furniture forming the arm rest having apertures 703, 704
900—front view of couch including left and right arm rests
900A—left side view of couch
901—back cushion
902—upholstery
902A—front of left arm rest
903A—front of right arm rest
1000—top end view of fastener
1000A—side view of fastener
1000B—bottom end view of fastener
1000C—cross-sectional view taken along the lines 10C-10C of FIG. 10A
1001—hexagonally shaped plate
1002—first surface of hexagonally shaped plate which adjustably interengages the furniture substrate proximate the slot in the upholstery/substrate when pushed therein
1003—second surface of hexagonally shaped plate which abuts the ornamental wood piece when screwed therein
1004, 1005, 1006, 1007, 1008, 1009—octagonal edges of flange/plate 1001
1010, 1010A, 1010B, 1010C, 1011, 1011A, 1011B, 1011C, 1012, 1012A, 1012B, 1012C, 1013, 1013A, 1013B, 1013C, 1014, 1014A, 1014B, 1014C, 1015, 1015A, 1015B, 1015C—angled branches of Christmas tree portion of fastener
1015R—arc-shaped radial portion of angled branches of Christmas tree portion of fastener
1016—threaded portion of fastener
1017—bore in shaft of fastener
1020—Christmas tree portion of fastener
1090—shaft of Christmas tree portion of fastener
1100—end view looking into the socket
1100A—cross-sectional view taken along the lines 11A-11A of FIG. 11
1101—hexagonal socket
1102—socket drive shaft
1103—seat of hexagonal socket engaging first surface of hexagonally shaped plate 1002
1104, 1105, 1106, 1107, 1108, 1109—hexagonal socket surfaces
1110—bore in socket 1101
1200—inner (rear) view of the ornamental wood piece
1200A—side view of the ornamental wood piece
1200B—outer (front) view of the ornamental wood piece
1200C—cross-sectional view taken along the lines 12C-12C of FIG. 12A
1201—left side ornamental wood piece
1201A—right side ornamental wood piece
1202—inner surface of ornamental wood piece
1203—outer surface of ornamental wood piece
1204—aperture for reception of fastener
1205—aperture for reception of fastener
1300—cross-sectional view of the fastener residing partially within a socket spaced apart from the receptacle in the ornamental piece of wood
1300A—cross-sectional view of the fastener threadedly interengaging the ornamental piece of wood
1400—front view of an arm rest illustrating a vertical slot and a sloped slot therein
1400A—a left side view of an arm rest illustrating partial insertion of a first fastener in the sloped slot and a second fastener in the vertical slot
1400B—a front view of an arm rest illustrating in phantom the position of the first fastener in the sloped slot and the position of the second fastener in the vertical slot with a positional adjustment being made with a rubber mallet.
1400C—front view of an arm rest illustrating in phantom the position of the first fastener in the sloped slot and the position of the second fastener in the vertical slot with another positional adjustment being made with a rubber mallet.

1400D—front view of an arm rest illustrating the ornamental wood piece in its final position securely fastened to the substrate
1401—angled upper slot
1402—vertical slot
1403—wooden substrate of the arm rest having slots 1402, 1403 therein
1404—rubber mallet
1500—a front view of an arm rest illustrating a first vertical slot and a second vertical slot.
1500A—a cross-sectional view taken along the lines 15A-15A of FIG. 15.
1500B—a front view of an arm rest illustrating the first fastener in the lower vertical slot and the second fastener in the upper slot with a positional adjustment being made with a rubber mallet.
1500C—a front view of the arm rest illustrating the ornamental wood piece in its final position securely fastened to the substrate.
1501—upper vertical slot in wooden substrate.
1502—lower vertical slot in wooden substrate
1600—a front view of an arm rest illustrating a first vertical slot and a second vertical slot.
1600A—a cross-sectional view taken along the lines 16A-16A of FIG. 16.
1600B—a cross-sectional view illustrating the interengagement of the ornamental piece of wood with the substrate/upholstery without a gap therebetween.
1600C—an enlargement of a portion of FIG. 16B illustrating interengagement of the Christmas tree portion of the fastener with the upper horizontal slot.
1600D—a front view of an arm rest illustrating the first fastener in the first upper horizontal slot and the second fastener in the second lower horizontal slot with a positional adjustment being made with a rubber mallet.
1600E—a front view of an arm rest illustrating the ornamental wood piece in its final position securely fastened to the substrate.
1601—upper horizontal slot in substrate
1602—lower horizontal slot in substrate Those skilled in the art will recognize that the invention has been described by way of example only and that changes to the invention may be made without departing from the spirit and the scope of the appended claims.

The invention claimed is:

1. A fastener in combination with an ornamental piece of wood and a furniture substrate, comprising:
said fastener includes a first portion, said first portion of said fastener includes branches;
each of said branches of said first portion of said fastener includes an arc-shaped end surface;
said fastener includes a threaded portion;
said fastener includes a flange portion positioned intermediate said first portion and said threaded portion;
said ornamental piece of wood includes an aperture therein;
said threaded portion of said fastener being threaded into said aperture in said ornamental piece of wood, said flange of said fastener engaging said ornamental piece of wood;
said furniture substrate includes a slot therein;
said first portion of said fastener interengaging said slot in said furniture substrate securing said ornamental piece of wood to said furniture substrate; and,
said first portion of said fastener slidable with respect to said slot positioning said ornamental piece of wood with respect to said furniture substrate.

2. A fastener in combination with an ornamental piece of wood and a furniture substrate as claimed in claim 1, wherein: said first portion of said fastener includes a shaft and said branches of said first portion of said fastener are spaced circumferentially about said shaft.

3. A fastener in combination with an ornamental piece of wood and a furniture substrate as claimed in claim 2, wherein said branches of said first portion of said fastener are deformable.

4. A fastener in combination with an ornamental piece of wood and a furniture substrate as claimed in claim 2, wherein said arc-shaped end surface of each of said branches extend radially equidistantly.

5. A fastener in combination with an ornamental piece of wood and a furniture substrate, as claimed in claim 2 wherein said branches are arranged in rows and said circumferential spacing of said branches includes gaps therebetween enabling said branches to fold inwardly and to resist extraction from said slot.

6. A fastener in combination with an ornamental piece of wood and a furniture substrate, as claimed in claim 1, wherein said flange is hexagonally shaped.

7. An ornamental piece of wood affixed to a furniture substrate, comprising:
a first fastener, said first fastener includes a first portion, said first portion of said first fastener includes branches;
a second fastener, said second fastener includes a first portion, said first portion of said second fastener includes branches;
said branches of said first portion of said first fastener include arc-shaped end surfaces;
said branches of said first portion of said second fastener include arc-shaped end surfaces;
said first fastener includes a threaded portion;
said second fastener includes a threaded portion;
said first fastener includes a flange portion positioned intermediate said first portion and said threaded portion;
said second fastener includes a flange portion positioned intermediate said first portion and said threaded portion;
an ornamental piece of wood, said ornamental piece of wood includes a first aperture and a second aperture therein;
said threaded portion of said first fastener being threaded into said first aperture in said ornamental piece of wood, said flange of said first fastener engaging said ornamental piece of wood;
said threaded portion of said second fastener being threaded into said second aperture in said ornamental piece of wood, said flange of said second fastener engaging said ornamental piece of wood;
said furniture substrate includes a first slot and a second slot therein;
said first portion of said first fastener interengaging said first slot in said furniture substrate and said first portion of said second fastener interengaging said second slot in said furniture substrate securing said ornamental piece of wood to said furniture substrate; and,
said first portion of said first fastener slidable with respect to said first slot in said furniture substrate and said first portion of said second fastener slidable with respect to said second slot in said furniture substrate positioning said ornamental piece of wood with respect to said furniture substrate.

8. An ornamental piece of wood affixed to a furniture substrate as claimed in claim 7 wherein said first and second slots in said furniture substrate are vertical slots.

9. An ornamental piece of wood affixed to a furniture substrate as claimed in claim 7 wherein said first and second slots in said furniture substrate are horizontal slots.

10. An ornamental piece of wood affixed to a furniture substrate as claimed in claim 7 wherein said first slot is a vertical slot and said second slot is a sloped slot.

11. An ornamental piece of wood affixed to a furniture substrate as claimed in claim 7 wherein: said first portion of said first fastener includes a shaft and said branches of said first portion of said first fastener are spaced circumferentially about said shaft; said first portion of said second fastener includes a shaft and said branches of said first portion of said second fastener are spaced circumferentially about said shaft.

12. An ornamental piece of wood affixed to a furniture substrate as claimed in claim 7 wherein said branches of said first portion of said first and second fasteners are deformable.

13. An ornamental piece of wood affixed to a furniture substrate as claimed in claim 7 wherein said arc-shaped end surface of each of said branches extends radially equidistantly.

14. An ornamental piece of wood affixed to a furniture substrate as claimed in claim 7 wherein said flanges of said first and second fasteners are hexagonally shaped.

15. An ornamental piece of wood affixed to a furniture substrate as claimed in claim 7 wherein said branches of said first and second fasteners are arranged in rows and said circumferential spacing of said branches includes gaps therebetween enabling said branches to fold inwardly and to resist extraction from said slots.

16. A method for attaching an ornamental piece of wood to a furniture substrate, using: a fastener, said fastener includes a first portion, said first portion of said fastener includes branches; each of said branches of said first portion of said fastener include an arc-shaped end surface, said arc-shaped end surface of each of said branches extending radially equidistantly, said fastener includes threaded portion, and said fastener includes a flange portion positioned intermediate said first portion and said threaded portion; said ornamental piece of wood includes an aperture therein; said furniture substrate includes a slot therein; comprising the steps of:
  threading said threaded portion of said fastener into said aperture in said ornamental piece of wood until said flange of said fastener engages said ornamental piece of wood;
  interengaging said first portion of said fastener with said slot in said furniture substrate securing said ornamental piece of wood to said furniture substrate; and,
  slidably positioning said first portion of said fastener with respect to said slot and arranging said ornamental piece of wood with respect to said furniture substrate.

17. A method for attaching an ornamental piece of wood to a furniture substrate, using: a first fastener and a second fastener, said first fastener includes a first portion, said second fastener includes a first portion, said first portion of said first fastener includes branches, said first portion of said second fastener includes branches, each of said branches of said first portion of said first fastener include an arc-shaped end surface, each of said branches of said first portion of said second fastener include an arc-shaped end surface, said arc-shaped end surfaces of said branches of said first portion of said first fastener extend radially equidistantly, said arc-shaped end surfaces of said branches of said first portion of said second fastener extend radially equidistantly, said first fastener includes a threaded portion and said second fastener includes a threaded portion, said first fastener includes a flange portion positioned intermediate said first portion and said threaded portion, said second fastener includes a flange portion positioned intermediate said first portion and said threaded portion; said ornamental piece of wood includes first and second apertures therein; said furniture substrate includes first and second slots therein; comprising the steps of:
  threading said threaded portion of said first fastener into said first aperture in said ornamental piece of wood until said flange of said fastener engages said ornamental piece of wood;
  threading said threaded portion of said second fastener into said second aperture in said ornamental piece of wood until said flange of said fastener engages said ornamental piece of wood;
  interengaging said first portion of said first fastener with said first slot in said furniture substrate and interengaging said first portion of said second fastener with said second slot in said furniture substrate securing said ornamental piece of wood to said furniture substrate; and,
  slidably positioning said first portion of said first fastener slidably with respect to said first slot and positioning said second portion of said second fastener with respect to said second slot arranging said ornamental piece of wood with respect to said furniture substrate.

18. A method for attaching an ornamental piece of wood to a furniture substrate, using: a first fastener and a second fastener, said first fastener includes a first portion, said second fastener includes a first portion, said first portion of said first fastener includes branches, said first portion of said second fastener includes branches, each of said branches of said first portion of said first fastener include an arc-shaped end surface, each of said branches of said first portion of said second fastener include an arc-shaped end surface, said arc-shaped end surfaces of said branches of said first portion of said first fastener extend radially equidistantly, said arc-shaped end surfaces of said branches of said first portion of said second fastener extend radially equidistantly, said first fastener includes a threaded portion and said second fastener includes a threaded portion, said first fastener includes a flange portion positioned intermediate said first portion and said threaded portion, said second fastener includes a flange portion positioned intermediate said first portion and said threaded portion; said ornamental piece of wood includes first and second apertures therein; said furniture substrate includes first and second slots therein; as claimed in claim 17, wherein said first and second slots in said furniture substrate are vertical slots.

19. A method for attaching an ornamental piece of wood to a furniture substrate, using: a first fastener and a second fastener, said first fastener includes a first portion, said second fastener includes a first portion, said first portion of said first fastener includes branches, said first portion of said second fastener includes branches, each of said branches of said first portion of said first fastener include an arc-shaped end surface, each of said branches of said first portion of said second fastener include an arc-shaped end surface, said arc-shaped end surfaces of said branches of said first portion of said first fastener extend radially equidistantly, said arc-shaped end surfaces of said branches of said first portion of said second fastener extend radially equidistantly, said first fastener includes a threaded portion and said second fastener includes a threaded portion, said first fastener includes a flange portion positioned intermediate said first portion and said threaded portion, said second fastener includes a flange portion positioned intermediate said first portion and said threaded portion; said ornamental piece of wood includes first and second apertures therein; said furniture substrate includes first and second slots therein; as claimed in claim 17 wherein said first and second slots in said furniture substrate are horizontal slots.

20. A method for attaching an ornamental piece of wood to a furniture substrate, using: a first fastener and a second fastener, said first fastener includes a first portion, said second fastener includes a first portion, said first portion of said first fastener includes branches, said first portion of said second fastener includes branches, each of said branches of said first portion of said first fastener include an arc-shaped end surface, each of said branches of said first portion of said second fastener include an arc-shaped end surface, said arc-shaped end surfaces of said branches of said first portion of said first fastener extend radially equidistantly, said arc-shaped end surfaces of said branches of said first portion of said second fastener extend radially equidistantly, said first fastener includes a threaded portion and said second fastener includes a threaded portion, said first fastener includes a flange portion positioned intermediate said first portion and said threaded portion, said second fastener includes a flange portion positioned intermediate said first portion and said threaded portion; said ornamental piece of wood includes first and second apertures therein; said furniture substrate includes first and second slots therein; as claimed in claim 17 wherein said first slot is a vertical slot and said second slot is a sloped slot.

21. A fastener in combination with an ornamental substrate and a furniture substrate, comprising:
said fastener includes a first portion, said first portion of said fastener includes branches;
each of said branches of said first portion of said fastener include an arc-shaped end surface;
said fastener includes a threaded portion;
said fastener includes a flange portion positioned intermediate said first portion and said threaded portion;
said ornamental substrate includes an aperture therein;
said threaded portion of said fastener being threaded into said aperture in said ornamental substrate, said flange of said fastener engaging said ornamental substrate;
said furniture substrate includes a slot therein;
said first portion of said fastener interengaging said slot in said furniture substrate securing said ornamental substrate to said furniture substrate; and,
said first portion of said fastener slidable with respect to said slot positioning said ornamental substrate with respect to said furniture substrate.

22. A fastener in combination with an ornamental substrate and a furniture substrate as claimed in claim 21 wherein said fastener is made of plastic.

23. A fastener in combination with an ornamental substrate and a furniture substrate as claimed in claim 22 wherein said fastener is made of polyamide.

* * * * *